(12) United States Patent
Monk et al.

(10) Patent No.: US 8,961,645 B2
(45) Date of Patent: Feb. 24, 2015

(54) METHOD AND SYSTEM FOR RECOVERING BOND COAT AND BARRIER COAT MATERIALS FROM OVERSPRAY AND ARTICLES

(71) Applicant: General Electric Company, Schenectady, NY (US)

(72) Inventors: David James Monk, Niskayuna, NY (US); Nicole Tibbetts, Niskayuna, NY (US); David Bucci, Niskayuna, NY (US); Lawrence Kool, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 135 days.

(21) Appl. No.: 13/716,333

(22) Filed: Dec. 17, 2012

(65) Prior Publication Data
US 2014/0165783 A1    Jun. 19, 2014

(51) Int. Cl.
| | | |
|---|---|---|
| *B03C 1/02* | (2006.01) | |
| *C22B 61/00* | (2006.01) | |
| *C22B 7/00* | (2006.01) | |
| *C22B 59/00* | (2006.01) | |

(52) U.S. Cl.
CPC . *B03C 1/02* (2013.01); *C22B 61/00* (2013.01); *C22B 7/005* (2013.01); *C22B 59/00* (2013.01)
USPC ........... 75/10.67; 75/610; 209/213; 423/21.1; 423/69

(58) Field of Classification Search
CPC .......... C22B 59/00; B03C 1/02; C01G 25/02; C01F 17/0043
USPC ............ 75/10.67, 610; 209/213; 423/69, 21.1
See application file for complete search history.

(56) References Cited

U.S. PATENT DOCUMENTS

| | | | |
|---|---|---|---|
| 4,235,710 A | 11/1980 | Sun | |
| 4,574,005 A | 3/1986 | Cobbs et al. | |
| 5,049,540 A | 9/1991 | Park et al. | |
| 5,968,820 A | 10/1999 | Zborowski et al. | |

(Continued)

FOREIGN PATENT DOCUMENTS

| | | |
|---|---|---|
| EP | 484461 A1 | 5/1992 |
| EP | 523415 A2 | 1/1993 |

(Continued)

OTHER PUBLICATIONS

"Particle Size Conversion Table." Sigma-Aldrich. Sigma-Aldrich Co. LLC., 2008. Web. Jun. 20, 2014. <http://www.sigmaaldrich.com/chemistry/stockroom-reagents/learning-center/technical-library/particle-size-conversion.html>.*

(Continued)

*Primary Examiner* — George Wyszomierski
*Assistant Examiner* — Tima M McGuthry Banks
(74) *Attorney, Agent, or Firm* — John P. Darling

(57) ABSTRACT

The disclosure relates generally to recovering bond coat materials and barrier coat materials from co-mingled mixtures of bond coat and barrier coat materials (e.g., plasma overspray waste), and from mixtures of co-mingled bond coat and barrier coat materials stripped from a substrate. The disclosure also relates to recovering rare earth elements (e.g., yttrium) from a barrier coat of the co-mingled plasma overspray waste or mixture of co-mingled bond coat and barrier coat materials stripped from the substrate.

19 Claims, 13 Drawing Sheets

(56) References Cited

U.S. PATENT DOCUMENTS

| | | |
|---|---|---|
| 6,251,160 B1 | 6/2001 | Edlinger |
| 6,565,625 B2 | 5/2003 | Hearld |
| 7,056,400 B1 | 6/2006 | Spangler, Jr. et al. |
| 7,988,769 B2 | 8/2011 | Wieland et al. |
| 2005/0167003 A1 | 8/2005 | Spangler, Jr. et al. |
| 2010/0012591 A1* | 1/2010 | Glebov et al. .......... 210/695 |
| 2011/0041691 A1 | 2/2011 | Weschke |
| 2011/0262324 A1 | 10/2011 | Fritz et al. |

FOREIGN PATENT DOCUMENTS

| | | |
|---|---|---|
| EP | 536648 A1 | 4/1993 |
| EP | 2335800 A1 | 6/2011 |
| JP | 11276952 A | 10/1999 |
| JP | 2012017486 A * | 1/2012 |
| WO | 9817832 A1 | 4/1998 |

OTHER PUBLICATIONS

Machine translation of the description of AT 509526 A1 published Sep. 15, 2011.*

Derwent Acc No. 2011-M34270 for the patent family including AT 509526 A1 by Gruber published Sep. 15, 2011.*

Machine translation of JP 2012017486 A published Jan. 2012.*

Bogdan, Sikora, et al., "Recovery of Alloying Elements from Grinding Sludge Formed during the Production of Magnetic Alloys of Al—Ni and Al—Ni—Co Type", Hutnik, Wydawnictwo Czasopism I Ksiazek Technicznych Sigma, Warsaw, Oct. 1, 1984, pp. 376-377, vol. No. 51, Issue No. 10.

PCT Search Report and Written Opinion issued May 14, 2014 in connection with corresponding PCT Patent Application No. PCT/US2013/073798.

* cited by examiner

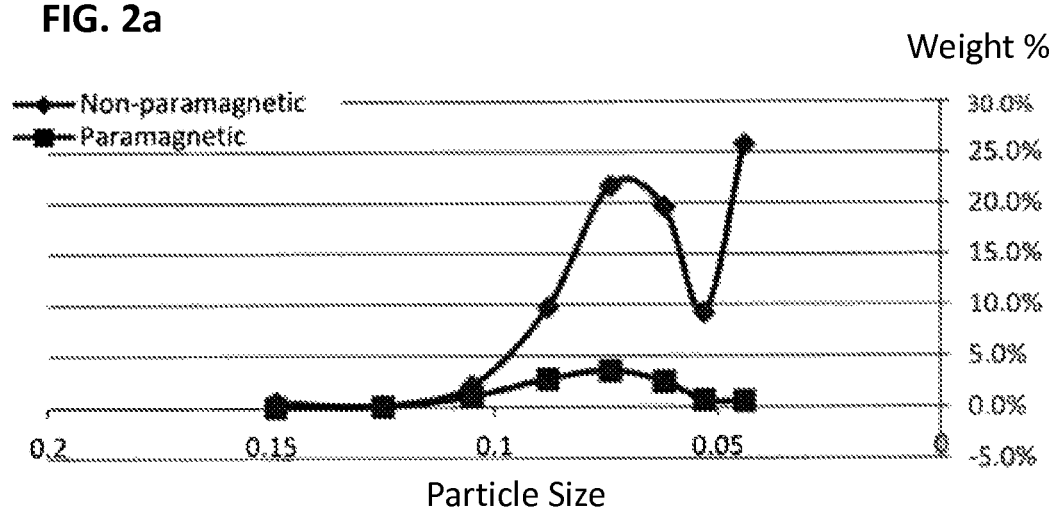

Diamagnetic

| Element | % |
|---|---|
| Ni | 62 |
| Cr | 27 |
| Al | 8 |
| Y | 1 |
| ZrO2 | 1 |
| HfO | 0 |

Non-Diamagnetic

| Element | % |
|---|---|
| Ni | 0 |
| Cr | 0 |
| Al | 1 |
| Y2O3 | 8 |
| ZrO2 | 88 |
| HfO2 | 2 |

| Incline | Field | Tilt | Weight | Percent |
|---|---|---|---|---|
| 13 | 0.01 | 15 | 9.55 | 8.8% |
| 13 | 0.025 | 15 | 2.116 | 2.0% |
| 13 | 0.05 | 15 | 0.1122 | 0.1% |
| 13 | 0.1 | 15 | 0 | 0.0% |
| 13 | 0.2 | 15 | 0.1832 | 0.2% |
| 13 | 0.3 | 15 | 0.1587 | 0.1% |
| 13 | 0.4 | 15 | 0.4657 | 0.4% |
| 13 | 0.5 | 15 | 0.6199 | 0.6% |
| 13 | 0.6 | 15 | 0.6026 | 0.6% |
| 13 | 0.7 | 15 | 0.4018 | 0.4% |
| 13 | 0.8 | 15 | 0.4717 | 0.4% |
| 13 | 0.9 | 15 | 0.5973 | 0.6% |
| 13 | 1 | 15 | 0.7559 | 0.7% |
| 13 | 1.1 | 15 | 2.2128 | 2.0% |
| 13 | 1.2 | 15 | 4.6567 | 4.3% |
| 13 | 1.3 | 15 | 7.0618 | 6.5% |
| 13 | 1.4 | 15 | 3.6777 | 3.4% |
| 13 | 1.5 | 15 | 0.7045 | 0.7% |
| 13 | 1.6 | 15 | 0.1033 | 0.1% |
| 13 | 1.7 | 15 | 72.455 | 66.9% |
| 13 | 1.6 | 7.5 | 0.057 | 0.1% |
| 13 | 1.6 | 3.25 | 0.2534 | 0.2% |
| 13 | 1.6 | 1.75 | 2.8417 | 2.6% |
| 13 | 1.6 | -1.75 | 69.0904 | 63.8% |
| 13 | 1.6 | -3.25 | 0.2125 | 0.2% |

FIG. 6

| Field | Incline | Tilt | Weight | Percent |
|---|---|---|---|---|
| 0.01 | 13 | 15 | 0.0477 | 0.0% |
| 0.03 | 13 | 15 | 3.5733 | 3.2% |
| 0.05 | 13 | 15 | 2.5046 | 2.3% |
| 0.08 | 13 | 15 | 0.0984 | 0.1% |
| 0.10 | 13 | 15 | 2.8471 | 2.6% |
| 0.20 | 13 | 15 | 3.0222 | 2.7% |
| 0.30 | 13 | 15 | 2.6534 | 2.4% |
| 0.40 | 13 | 15 | 3.8072 | 3.4% |
| 0.50 | 13 | 15 | 6.3054 | 5.7% |
| 0.60 | 13 | 15 | 1.8543 | 1.7% |
| 0.70 | 13 | 15 | 0.3705 | 0.3% |
| 0.80 | 13 | 15 | 0.7334 | 0.7% |
| 0.90 | 13 | 15 | 1.2683 | 1.1% |
| 1.00 | 13 | 15 | 0.8646 | 0.8% |
| 1.10 | 13 | 15 | 1.1964 | 1.1% |
| 1.20 | 13 | 15 | 6.1125 | 5.5% |
| 1.30 | 13 | 15 | 3.7533 | 3.4% |
| 1.40 | 13 | 15 | 1.3960 | 1.3% |
| 1.50 | 13 | 15 | 0.1004 | 0.1% |
| 1.60 | 13 | 15 | 0.2943 | 0.3% |
| 1.7 | 13 | 15 | 67.6967 | 61.3% |
| 1.60 | 13 | 12.5 | 1.1711 | 1.1% |
| 1.60 | 13 | 10 | 4.2900 | 3.9% |
| 1.60 | 13 | 7.5 | -5.4611 | -4.9% |

| | Weight (g) | Vol (mL) | Density | Weight (g) | Al | Ca | Co | Cr | Fe | Hf | Mg | Mn | Mo | Na | Ni | Si | Ti | W | Y | Zr |
|---|---|---|---|---|---|---|---|---|---|---|---|---|---|---|---|---|---|---|---|---|
| Acetic | | | | | | | | | | | | | | | | | | | | |
| Sulfuric Acid | 0.5093 | 10.00 | 1.80 | 18.0144 | 0.0% | 0.0% | 0.0% | 0.1% | 0.1% | 0.0% | 0.0% | 0.0% | 0.0% | 0.0% | 0.2% | 0.0% | 0.0% | 0.0% | 0.1% | 0.0% |
| Nitric Acid | 0.4041 | 10.00 | 1.40 | 13.9754 | 0.2% | 0.0% | 0.0% | 0.1% | 0.0% | 0.0% | 0.0% | 0.0% | 0.0% | 0.0% | 0.9% | 0.0% | 0.0% | 0.0% | 0.2% | 0.0% |
| Aqua Regia | 0.2015 | 10.00 | 1.79 | 17.9 | 2.2% | 0.0% | 0.2% | 4.9% | 0.0% | 0.0% | 0.0% | 0.0% | 0.0% | 0.0% | 0.0% | 0.0% | 0.0% | 0.0% | 0.4% | 0.0% |
| Hydrochloric Acid | 0.2079 | 10.00 | 1.19 | 11.9 | 1.6% | 0.0% | 0.1% | 3.6% | 0.0% | 0.1% | 0.0% | 0.0% | 0.0% | 0.0% | 0.0% | 0.0% | 0.0% | 0.0% | 0.3% | 0.0% |
| 1.40R5 | 0.2086 | 10.00 | 1.19 | 14.8891 | 0.1% | 0.0% | 0.0% | 0.1% | 0.0% | 0.1% | 0.0% | 0.0% | 0.0% | 0.0% | 0.3% | 0.0% | 0.0% | 0.0% | 0.1% | 5.3% |
| 110R1 | 0.3701 | 10.00 | 1.32 | 13.1922 | 0.7% | 0.0% | 0.0% | 1.6% | 0.0% | 0.7% | 0.0% | 0.0% | 0.0% | 0.1% | 0.1% | 0.1% | 0.0% | 0.0% | 0.0% | 0.0% |
| ACR1 | 0.1833 | 10.00 | 1.38 | 13.842 | 1.4% | 0.1% | 0.3% | 3.7% | 0.1% | 0.1% | 0.0% | 0.0% | 0.0% | 0.1% | 0.2% | 0.0% | 0.1% | 0.0% | 1.2% | 3.6% |
| 27.4% ABF | 0.2673 | 10.00 | 1.08 | 10.8045 | 0.0% | 0.0% | 0.1% | 0.0% | 0.0% | 0.2% | 0.0% | 0.0% | 0.0% | 0.0% | 0.2% | 0.1% | 0.0% | 0.0% | 0.0% | 9.6% |

FIG. 11

| | Weight (g) | Vol (ml) | Density | Weight (g) | Al | Ca | Co | Cr | Fe | Hf | Mg | Mn | Mo | Na | Ni | Si | Ti | W | Y | Zr |
|---|---|---|---|---|---|---|---|---|---|---|---|---|---|---|---|---|---|---|---|---|
| Sulfuric Acid | 0.5093 | 10.00 | 1.80 | 18.0144 | 0.0% | 0.0% | 0.0% | 0.1% | 0.1% | 0.0% | 0.0% | 0.0% | 0.0% | 0.0% | 0.2% | 0.0% | 0.0% | 0.0% | 0.1% | 0.0% |
| Nitric Acid | 0.4041 | 10.00 | 1.40 | 13.9754 | 0.2% | 0.0% | 0.0% | 0.1% | 0.0% | 0.0% | 0.0% | 0.0% | 0.0% | 0.0% | 0.9% | 0.0% | 0.0% | 0.0% | 0.2% | 0.0% |
| Aqua Regia | 0.2015 | 10.00 | 1.79 | 17.9 | 2.2% | 0.0% | 0.2% | 9.6% | 0.0% | 0.0% | 0.0% | 0.0% | 0.0% | 0.0% | 49.7% | 0.0% | 0.0% | 0.0% | 0.4% | 0.0% |
| Hydrochloric Acid | 0.2079 | 10.00 | 1.19 | 11.9 | 1.5% | 0.0% | 0.1% | 1.3% | 0.0% | 0.0% | 0.0% | 0.0% | 0.0% | 0.0% | 10.9% | 0.0% | 0.0% | 0.0% | 0.3% | 0.0% |
| 140R5 | 0.2086 | 10.00 | 1.19 | 14.8891 | 0.1% | 0.0% | 0.0% | 0.1% | 0.0% | 0.1% | 0.0% | 0.0% | 0.0% | 0.0% | 0.3% | 0.0% | 0.0% | 0.0% | 0.1% | 5.3% |
| 110R1 | 0.3701 | 10.00 | 1.32 | 13.1922 | 0.7% | 0.0% | 0.2% | 1.6% | 0.0% | 0.1% | 0.0% | 0.0% | 0.0% | 0.0% | 0.1% | 0.1% | 0.0% | 0.0% | 0.0% | 29.1% |
| ACR1 | 0.1003 | 10.00 | 1.38 | 13.842 | 1.4% | 0.1% | 0.2% | 3.7% | 0.1% | 0.1% | 0.0% | 0.0% | 0.0% | 0.1% | 10.4% | 0.0% | 0.1% | 0.0% | 0.0% | 3.6% |
| 27.4% ABF | 0.2673 | 10.00 | 1.08 | 10.8045 | 0.0% | 0.0% | 0.1% | 0.0% | 0.0% | 0.2% | 0.0% | 0.0% | 0.0% | 0.0% | 0.2% | 0.1% | 0.0% | 0.0% | 0.0% | 9.8% |

FIG. 12

| | Weight (g) | Vol (mL) | Density | Weight (g) | Al | Ca | Co | Cr | Fe | Hf | Mg | Mn | Mo | Na | Ni | Si | Ti | W | Y | Zr |
|---|---|---|---|---|---|---|---|---|---|---|---|---|---|---|---|---|---|---|---|---|
| Sulfuric Acid | 0.2010 | 10 | 1.84 | 18.4 | 0.1% | 0.0% | 0.0% | 0.0% | 0.1% | 0.0% | 0.0% | 0.0% | 0.0% | 0.0% | 0.1% | 0.0% | 0.1% | 0.0% | 0.0% | 0.0% |
| Nitric Acid | 0.2807 | 10 | 1.42 | 14.2 | 0.2% | 0.2% | 0.0% | 0.0% | 0.1% | 0.0% | 0.0% | 0.0% | 0.0% | 0.0% | 0.0% | 0.0% | 0.1% | 0.0% | 0.0% | 0.0% |
| Aqua Regia | 0.1998 | 10 | 1.51 | 15.1 | 0.5% | 0.3% | 0.1% | 0.1% | 0.3% | 0.0% | 0.0% | 0.1% | 0.0% | 0.0% | 0.5% | 0.0% | 0.4% | 0.0% | 0.0% | 0.1% |
| Hydrochloric Acid | 0.2057 | 10 | 1.19 | 11.9 | 0.4% | 0.2% | 0.1% | 0.1% | 0.3% | 0.0% | 0.0% | 0.1% | 0.0% | 0.0% | 0.3% | 0.0% | 0.3% | 0.0% | 0.0% | 0.1% |
| 149R5 | 0.2420 | 10 | 1.49 | 14.8891 | 0.2% | 0.3% | 0.0% | 0.0% | 0.0% | 0.0% | 0.0% | 0.0% | 0.0% | 0.0% | 0.0% | 0.0% | 0.1% | 0.0% | 0.0% | 2.0% |
| 110R1 | 0.3377 | 10 | 1.32 | 13.1976 | 0.7% | 0.0% | 0.1% | 0.1% | 0.3% | 0.0% | 0.0% | 0.1% | 0.0% | 0.0% | 0.2% | 0.4% | 1.1% | 0.0% | 0.0% | 2.3% |
| ACR1 | 0.4520 | 8 | 1.39 | 11.0923 | 0.7% | 0.3% | 0.1% | 0.1% | 0.3% | 0.0% | 0.1% | 0.2% | 0.0% | 0.0% | 0.2% | 0.4% | 0.9% | 0.0% | 0.2% | 0.7% |
| 27.4% ABF | 0.5300 | 10 | 1.08 | 10.7934 | 0.0% | 0.0% | 0.0% | 0.0% | 0.2% | 0.0% | 0.1% | 0.1% | 0.0% | 0.0% | 0.1% | 0.4% | 0.8% | 0.0% | 0.0% | 0.3% |
| Water post 110R1 | 0.3377 | 10 | 1.00 | 10 | 0.1% | 0.0% | 0.0% | 0.0% | 0.0% | 0.0% | 0.0% | 0.0% | 0.0% | 0.0% | 0.0% | 0.1% | 0.1% | 0.0% | 0.0% | 0.1% |
| Water post ACR1 | 0.4520 | 10 | 1.00 | 10 | 0.1% | 0.0% | 0.0% | 0.0% | 0.0% | 0.0% | 0.0% | 0.0% | 0.0% | 0.0% | 0.0% | 0.0% | 0.1% | 0.0% | 0.0% | 0.0% |
| Water post ABF | 0.5300 | 10 | 1.00 | 10 | 0.1% | 0.0% | 0.0% | 0.0% | 0.1% | 0.0% | 0.0% | 0.0% | 0.0% | 0.0% | 0.0% | 0.0% | 0.2% | 0.0% | 0.0% | 0.6% |
| Nitric post 110R1 | 0.3377 | 10 | 1.32 | 13.1976 | 0.0% | 0.2% | 0.0% | 0.0% | 0.0% | 0.0% | 0.0% | 0.0% | 0.0% | 0.0% | 0.0% | 0.0% | 0.1% | 0.0% | 0.3% | 0.4% |
| Nitric post ACR1 | 0.4520 | 8 | 1.39 | 11.0923 | 0.0% | 0.0% | 0.0% | 0.0% | 0.0% | 0.0% | 0.0% | 0.0% | 0.0% | 0.0% | 0.1% | 0.2% | 0.0% | 0.0% | 0.0% | 0.0% |
| Nitric post ABF | 0.5300 | 10 | 1.08 | 10.7934 | 0.2% | 0.0% | 0.0% | 0.0% | 0.0% | 0.0% | 0.0% | 0.0% | 0.0% | 0.0% | 0.1% | 0.0% | 0.1% | 0.0% | 0.0% | 0.1% |

FIG. 13

METHOD AND SYSTEM FOR RECOVERING BOND COAT AND BARRIER COAT MATERIALS FROM OVERSPRAY AND ARTICLES

BACKGROUND

The processing technologies involved in certain manufacturing fields employ deposition techniques that involve considerable waste. The ability to recover the constituent materials of the overspray minimizes the cost of waste disposal and reduces the amount of new materials. Recycling efforts in this area also help in preserving natural resources.

According to one illustrative embodiment, modern gas turbines, especially aircraft engines and power generation systems, must satisfy the highest demands with respect to reliability, power, efficiency, economy, and operating service life. In the development of aircraft engines and power generation systems, the material selection, the search for new suitable materials, as well as the search for new production methods, among other things, play an important role in meeting standards and satisfying the demand.

The use of coatings on components such as combustors, high pressure turbine blades, vanes and shrouds is increasing in commercial as well as military gas turbine engines. Such coatings enable the desirable performance characteristics and operating in certain harsh environmental conditions. In one example, a bond coating and a barrier coating are deposited on articles such as the aeroengine and industrial turbines.

Barrier coatings in some applications are comprised of a material, such as yttria stabilized zirconia, that is applied to the various aircraft engine and gas turbine combustion components. In order to achieve good adhesion between the base metal and the barrier coating, a bond coat is typically applied to the base material. The barrier coating is then applied to the bond coat. The coating layers are applied such as by using high velocity oxy-fuel (HVOF) and/or plasma spray techniques, where powdered bond coating and barrier coating are propelled at high velocity under high temperature in a sheath gas at the part to be coated. Since coating booths are used for multiple bond coating and barrier coating chemistries interchangeably, all these materials (and other contaminants) become comingled as overspray. These powders are expensive and the overspray materials require costly disposal.

The HVOF and plasma spray processes tend to be very inefficient when one combines the natural spray efficiency with the component motion that often works on and off the part to be coated, and only a portion of the bond coating or barrier coating is coated on the part. During the deposition of the barrier coat and the bond coat on the article, the process inevitably involves overspray that does not become part of the article, and instead is overspray waste. Such overspray is generally comingled with other overspray waste materials. Recycling of the barrier coat and bond coat offer a significant cost savings, and eliminate disposal problems. Indeed, recovery of yttria or other rare earth element contained in the barrier coat, for example, has several advantages, including offsetting the need to purchase rare earth elements for thermal barrier coating manufacture as well as eliminating disposal considerations.

Presently, there is a need for new and improved methods to recycle waste overspray that comprises thermal barrier coat and/or bond coat (ceramic and metallic materials). Such new and useful methods and systems can permit less waste of costly raw materials used in the manufacture of articles used, for example, in aviation and energy-related manufacturing service shops. In particular, due to the value of the components that make up the thermal barrier coat and bond coat, any means to recoup and/or reduce the wastage of the thermal barrier coat and/or bond coat as a result of the application process would be of great value to industry.

SUMMARY

Aspects of the present disclosure provide for the separation of the bond coat (e.g., metallic bond coat) and barrier coat (e.g., ceramic top coat) materials from co-mingled HVOF and plasma overspray waste or from co-mingled mixtures from coatings physically or chemically stripped from a substrate. Barrier coats such as thermal barrier coats and bond coats are applied to components and portions of the overspray of thermal barrier coat and bond coat are disposed of as waste, as the recycler may only have interest in certain elemental content such as nickel or cobalt. However, the overspray comprises many materials (or elements) that are inherently valuable. In one aspect, the disclosure is to take the comingled overspray and extract the valuable bond coatings and barrier coatings components. In particular embodiments, the disclosure provides methods of recovering bond coats in their oxidized and/or reduced forms. The value of the waste material as separated according to the present disclosure is of great value compared to the comingled waste. Further, in one embodiment, the individual components, e.g. yttrium, are recovered from the waste overspray, or in conjunction with the removal of yttrium-containing coatings during repair and reworking.

One aspect of the present disclosure is a method for separating comingled overspray waste comprising barrier coat and oxidized and non-oxidized bond coat into component parts, said method comprising: extracting the comingled overspray waste; separating out certain sized particles; applying one or more magnetic fields to yield various paramagnetic and a diamagnetic components; to yield a oxidized and unoxidized bond coat components and the barrier coat material.

In one aspect, the present disclosure permits separation of such components to occur where instead of starting with comingled overspray waste, the starting material is comingled waste that is present in the form of a slurry after chemical stripping of the articles that had the barrier coat and bond coat.

One aspect of the present disclosure is a method for recovering bond coat and barrier coat materials from overspray waste containing co-mingled bond coat and barrier coat materials, said method comprising: providing an overspray waste comprising co-mingled bond coat and barrier coat materials, wherein the bond coat material comprises a weakly paramagnetic bond coat component and a strongly paramagnetic bond coat oxide component; applying a magnetic field to the overspray waste under conditions effective to yield a paramagnetic fraction comprising the paramagnetic bond coat oxide component and a weakly/non-paramagnetic fraction comprising the bond coat component co-mingled with the diamagnetic barrier coat material; and subjecting the weakly/non-paramagnetic fraction to a magnetic field under conditions effective to separate the weakly paramagnetic bond coat component from the diamagnetic barrier coat material.

In certain embodiments, the step of providing the overspray waste comprises collecting co-mingled excess bond coat material and barrier coat material from air plasma spray and/or electron beam physical vapor deposition processes. In one embodiment, the bond coat material and the barrier coat material each comprises yttrium. In a particular embodiment, the bond coat material comprises MCrAlY, wherein M is Fe, Ni, or Co. In another embodiment, the barrier coat material comprises yttria stabilized zirconia or other rare earth stabilizers in zirconia such as, but not limited to, calcia, ceria, scandia, magnesia, india, lanthana, neodymia, ytterbia, strontia, barium oxide, nickel oxide, ferric oxide, cobaltous oxide, dysprosia, gadolinia, samaria, erbia, europia, praseodyrnia, and mixtures thereof.

In certain embodiments, the step of applying the paramagnetic field comprises exposing the overspray waste to a magnet that attracts the strongly paramagnetic bond coat oxide component, thereby separating the strongly paramagnetic fraction from the weakly/non-paramagnetic fractions. In one embodiment, the magnet provides a field current of between about 0.001 and about 0.15 amps (e.g., as performed on a Frantz LB-1). In one embodiment, the step of applying the paramagnetic field to the overspray waste is repeated one or more times prior to the step of subjecting the weakly/non-paramagnetic fraction to other magnetic fields.

In certain embodiments, the step of subjecting the weakly/non-paramagnetic fraction to a magnetic field comprises exposing the weakly/non-paramagnetic fraction to a magnet that repels the diamagnetic thermal barrier coat component and/or attracts the weakly paramagnetic bond coat component, thereby separating the diamagnetic thermal barrier coat component from the weakly paramagnetic bond coat material. In a particular embodiment, the magnet provides a field current of greater than about 0.15 amps. In one embodiment, the step of subjecting the non-paramagnetic fraction to the diamagnetic field is repeated one or more times.

In certain embodiments, the method of recovering bond coat and thermal barrier coat materials from overspray waste can further comprise: removing debris from the overspray waste through size exclusion prior to applying the paramagnetic field to the overspray waste.

In certain embodiments, the method of recovering bond coat and thermal barrier coat materials from overspray waste can further comprise: purifying, by way of chemically processing, one or more of the paramagnetic bond coat oxide component, the diamagnetic bond coat component, or the thermal barrier coat material isolated from the overspray waste.

Another aspect of the present disclosure is a collection of reusable fractions isolated from overspray waste containing co-mingled bond coat and thermal barrier coat materials according to the method of recovering bond coat and thermal barrier coat materials from overspray waste, said collection comprising: a first fraction comprising a strongly paramagnetic bond coat oxide component isolated from the overspray waste; a second fraction comprising a weakly paramagnetic-bond coat component isolated from the overspray waste; and a third fraction comprising a diamagnetic thermal barrier coat material isolated from the overspray waste, wherein each of the first, second, and third fractions is separate from one another.

Another aspect of the present disclosure is a method for recovering bond coat and barrier coat materials from a mixture of co-mingled bond coat and barrier coat materials stripped from a substrate, said method comprising: providing a mixture of co-mingled bond coat and barrier coat materials stripped from a substrate, wherein the bond coat material comprises a diamagnetic barrier coat component and various paramagnetic bond coat components; applying a magnetic field to the mixture under conditions effective to yield a paramagnetic fraction comprising the strongly paramagnetic bond coat oxide component and a weakly/non-paramagnetic fraction comprising the weakly paramagnetic bond coat component co-mingled with the diamagnetic barrier coat material; and subjecting the remaining fraction to a magnetic field under conditions effective to separate the diamagnetic barrier coat component from the weakly paramagnetic bond coat material.

In certain embodiments, the step of providing the mixture of co-mingled bond coat and barrier coat materials comprises stripping the barrier coat and at least a portion of the bond coat material from the substrate by chemical acid etching or physical removal processing. In a particular embodiment, said physical removal processing comprises grit blasting.

Another aspect of the present disclosure is a collection of reusable fractions isolated from a mixture of co-mingled bond coat and thermal barrier coat materials stripped from a substrate according to the method for recovering bond coat and thermal barrier coat materials from a mixture of co-mingled bond coat and thermal barrier coat materials stripped from a substrate, said collection comprising: (i) a first fraction comprising a paramagnetic bond coat component isolated from the mixture; (ii) a second fraction comprising a diamagnetic thermal barrier coat material isolated from the mixture, wherein each of the first, and second fractions is separate from one another.

Another aspect of the present disclosure is a method for recovering yttrium from a barrier coat stripped from a metal substrate, said method comprising: (i) stripping a barrier coat from a metal substrate to yield a mixture comprising the stripped barrier coat co-mingled with one or more of a bond coat material and a byproduct of the stripping process, wherein said bond coat material comprises one or both of a diamagnetic bond coat component and a paramagnetic bond coat component; (ii) applying a paramagnetic field to the mixture under conditions effective to yield a paramagnetic fraction comprising the paramagnetic bond coat component and a non-paramagnetic fraction comprising the diamagnetic barrier coat and potentially physical separation media (a non-limiting example is grit blast material); (iii) optionally subjecting the non-paramagnetic fraction to a diamagnetic field under conditions effective to separate the diamagnetic barrier coat component from the physical separation media; and (iv) recovering yttrium from the barrier coat.

In certain embodiments, the step of stripping the barrier coat from the metal substrate comprises chemical acid etching or physical removal processing. In a particular embodiment, the physical removal processing can include, without limitation, grit blasting.

In certain embodiments, the step of recovering yttrium from the barrier coat comprises a chemical treatment process effective to isolate the yttrium from the barrier coat.

These and other aspects, features, and advantages of this disclosure will become apparent from the following detailed description of the various aspects of the disclosure taken in conjunction with the accompanying drawings.

BRIEF DESCRIPTION OF THE DRAWINGS

These and other features, aspects, and advantages of the present systems and methods will become better understood when the following detailed description is read with reference to the accompanying drawings in which like characters represent like parts throughout the drawings, and wherein:

FIGS. 2A-2C are graphs and charts showing the particle size distribution and elemental compositions as measured by X-ray fluorescence (XRF) obtained after parametric oxidized bond coat material is separated from non-oxidized bond coat and thermal barrier coating using a magnetic field according to one example.

FIG. 6 is a chart showing field (amps), ramp longitudinal incline (degrees), and axial tilt (degrees) conditions used in one embodiment of the present disclosure relating to magnetic separation of air plasma overspray.

FIG. 8 is a chart showing field (amps), ramp longitudinal incline (degrees), and axial tilt (degrees) conditions used in one embodiment of the present disclosure relating to magnetic separation of air plasma overspray.

FIG. 10 is a chart showing the results of one embodiment of the chemical purification process used to recover nickel and yttrium from oxidized bond coat.

FIG. 11 is a chart showing the results of one embodiment of the chemical purification process used to recover bond coat contaminated with barrier coat.

FIG. 12 is a chart showing the results of one embodiment of the chemical purification process used to recover barrier coat contaminated with bond coat.

FIG. 13 is a chart showing the results of one embodiment of the chemical purification process used to recover yttrium stabilized zirconia from spent grit blast.

DETAILED DESCRIPTION

Figure 1:
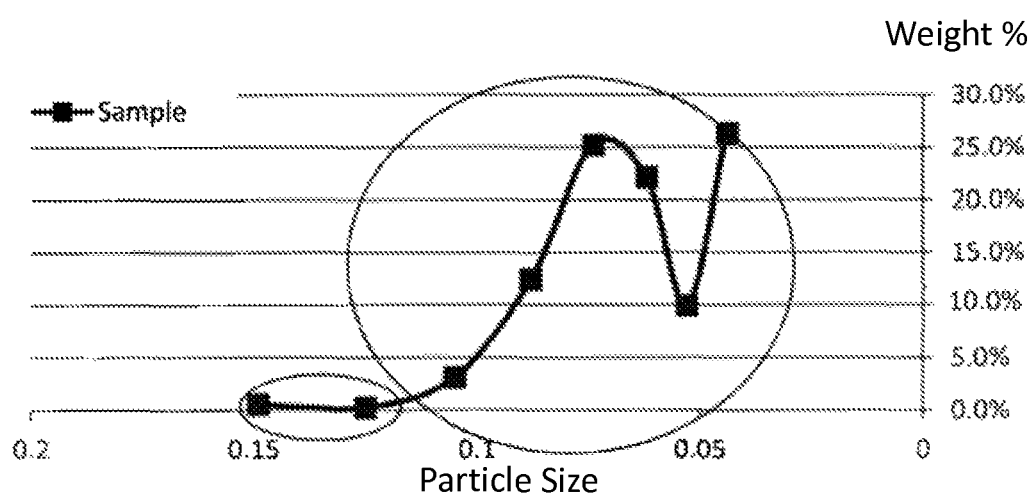
FIG. 1 shows one embodiment of the particle size distribution obtained after plasma residue containing bond coating and thermal barrier coating is processed through a sieving system.

The present disclosure relates generally to methods of recovering bond coat (e.g., a metallic bond coat) and barrier coat (e.g., thermal barrier coat, environmental barrier coat, abradable coat, wear coat) materials from overspray and articles comprising co-mingled bond coat and barrier coat materials. The disclosure also relates to methods of recovering individual constituents from co-mingled bond coat and barrier coat materials, including, for example, such individual constituents as rare earth metals (e.g., yttrium).

In a general aspect, the present disclosure provides methods for treating waste plasma spray deposition overspray in a way that separates the overspray into its individual components: bond coat oxides, bond coat, and barrier coat. For example, this disclosure provides a method for the separation of bond coat (a nonlimiting example is NiCrAlY) and barrier coat materials (a nonlimiting example is yttria stabilized zirconia) from co-mingled plasma overspray waste. Such waste streams are commonly found in aviation and energy manufacturing and service shops where these coatings are applied.

As provided in more detail herein, the bond coat is disposed on the article substrate and the barrier coat is disposed on the bond coat. The bond coat and/or barrier coat can be deposited as an overspray. Current practices generally dispose of the overspray as waste, even though the materials contained in these coatings are inherently valuable. The reason for this is that, there is no known effective method or teaching of how to separate the overspray waste into its individual component parts. By separating the components according to the methods of the present disclosure, the value of the waste material is much higher than that of the comingled waste. Once separated, one can obtain the maximum value for materials by recycling them or potentially reuse them in the plasma spray process. By enabling separation of the individual plasma spray components, manufacturing sites can recycle these materials.

As used herein, the term "substrate" refers to any material that includes at least a barrier coat and a portion coated by the barrier coat. In a particular example, the substrate can include, without limitation, a metal substrate, where the portion coated by the barrier coat is predominantly metal. In other particular examples, the "substrate" can further include a bond coat between the barrier coat and the portion coated by the barrier coat. In another particular example, a substrate can include, without limitation, a metal substrate that forms at least a portion of a part used in the manufacture of an aircraft, a marine propulsion device, or a power generation device.

As described in more detail herein, in accordance with aspects of the present disclosure, a combination of physical separation techniques, including sieving and the application of various magnetic fields, can be used to separate out the various components of the plasma overspray. In general, sieving removes bulk contaminants that find their way into the waste, application of a weak magnetic field attracts and separates bond coat oxides, and application of a powerful electromagnetic field attracts non-oxidized bond coat materials and separates them from barrier coat materials.

In one embodiment, the mixture of co-mingled bond coat and barrier coat materials can be heated to a temperature effective to facilitate separation of the bond coat and the barrier coat material. In a particular embodiment, a suitable heating temperature is above 400° C. In another particular embodiment, a suitable heating temperature is any temperature between about 400° C. and 750° C.

Barrier coats are used in aircraft and marine propulsion and power generation. They contain the rare earth element yttrium (and sometimes other rare earths and precious metals), a material that is subject to diminishing material sources and increased competition for raw materials (for example, as a result of growing demand in the lighting industry). The reuse of barrier coat overspray and recovery of yttrium and other scarce materials from service and end-of-life (scrap) parts can help address these diminishing sources, by reducing the yttrium and other scarce materials consumed throughout the barrier coat application processes.

As used herein, the term "debris" generally refers to any material that is included in the overspray waste or mixture of co-mingled bond coat and barrier coat materials stripped from a substrate and that is neither a bond coat material nor a barrier coat material (e.g., a thermal barrier coat material). For example, debris can include, without limitation, materials such as dirt, dust, metal chips, wood pieces, insects, and the like. In a particular example, debris can include, without limitation, any particle that is about 0.15 millimeters or greater in size that is neither a bond coat material nor a barrier coat material.

In one embodiment, the debris is removed by passing the overspray waste through a sieving system in order to separate the debris from the co-mingled bond coat and thermal barrier coat materials. Suitable sieving systems can comprise a sieve that traps debris and allows the co-mingled bond coat and thermal barrier coat materials to pass therethrough. In one embodiment, the sieve has a mesh size of between about 100 and about 200. In a particular embodiment, the sieve has a mesh size of about 140.

As used herein, mesh sizes and mesh sieves are meant to refer to United States standard sieves, unless explicitly stated otherwise.

As used herein, the term "barrier coat" is non-limiting and is used to describe any coating applied to a surface for protective means, such as to an article operating in a combustion environment. As an example, the term barrier coat also refers to thermal barrier coats, environmental barrier coats, ceramic top coats, abradable coats, wear coats, and the like, which are generally known in the art.

Thermal Barrier Coats (TBCs) are low thermal conductivity ceramics that are typically applied to the hot gas side of a metal substrate for insulation. TBCs are used on articles such as combustion liners, transition pieces, vanes/nozzles, and airfoils/blades of aircraft engines, marine engines, and gas turbines. In conjunction with air-cooling, TBCs enable operation of engines and turbines at temperatures close to or even above the melting temperature of the alloys that they coat. These elevated operating temperatures yield increases in power, fuel economy, and part lifetime, which are critical for many applications.

As noted, the thermal insulation provided by a thermal barrier coating (TBC) enables such components to survive higher operating temperatures, increases component durability, and improves engine reliability. TBC is typically a ceramic material deposited on an environmentally-protective bond coat to form what is termed a TBC system. Bond coat materials widely used in TBC systems include oxidation-resistant overlay coatings such as MCrAlX (where M is iron, cobalt and/or nickel, and X is yttrium or another rare earth element), and diffusion coatings such as diffusion aluminides that contain aluminum intermetallics.

Various ceramic materials have been proposed as TBC's, the most widely used being zirconia ($ZrO_2$) partially or fully stabilized by yttria ($Y_2O_3$), magnesia (MgO), or ceria ($CeO_2$) to yield a tetragonal microstructure that resists phase changes. Though various other stabilizers have been proposed for zirconia, yttria-stabilized zirconia (YSZ) is often used due at least in part to its high temperature capability, low thermal conductivity, and relative ease of deposition such as by air plasma spraying (APS), flame spraying such as hyper-velocity oxy-fuel (HVOF), physical vapor deposition (PVD) and other known TBC application techniques. Ceramic materials and particularly binary yttria-stabilized zirconia (YSZ) are widely used. TBCs formed by these methods generally have a lower thermal conductivity than a dense ceramic of the same composition as a result of the presence of microstructural defects and pores at and between grain boundaries of the TBC microstructure.

Yttria-stabilized zirconia is also used as a result of the relative ease with which it can be deposited by plasma spraying, flame spraying and physical vapor deposition (PVD) techniques. TBCs employed in the highest temperature regions of gas turbine engines are often deposited by PVD, particularly electron beam physical vapor deposition (EB-PVD), which yields a columnar, strain-tolerant grain structure that is able to expand and contract without causing damaging stresses that lead to spallation. Similar columnar microstructures can be produced using other atomic and molecular vapor processes, such as sputtering (e.g., high and low pressure, standard or collimated plume), ion plasma deposition, and all forms of melting and evaporation deposition processes (e.g., cathodic arc, laser melting, etc.).

TBCs are typically applied to the metal substrate in two layers, a bond coat layer that promotes adhesion and a ceramic top-coat that serves as insulation. In various configurations, the bond coat layer is approximately 75 to 150 um thick and often consists of MCrAlY (M=Fe, Ni, Co) alloy, however; nickel and platinum aluminides are also used as bond coats in aircraft engines. In various embodiments, the top coat layer is thicker, at about 300 to 600 um, and is most often made of yttria stabilized zirconia (YSZ), which has one of the lowest thermal conductivities at elevated temperatures of all ceramics.

As set forth herein, in various aspects, the present disclosure is directed to providing methods for addressing the diminishing source concerns and use of rare earth metals that are used in TBCs and in bond coats. Yttrium, a rare earth metal, is a constituent of BCs; for example, in TBCs, the YSZ top coat contains 6 wt % yttrium (as yttria, $Y_2O_3$) and the MCrAlY bond coat typically contains 1 wt % yttrium. In addition, yttrium is used in the superalloy substrates themselves and additional yttrium is used elsewhere in the superalloy manufacturing process. Yttrium is considered a diminishing material source due to limited mining activity and increased global demand. According to the United States Geological Survey (USGS), the US imported all the yttrium it consumes, an estimated 760 MT (as yttria) in 2010. The primary yttrium consumer was the lighting industry, which used roughly 81% of yttrium to make high efficiency fluorescent lamp phosphors. The bulk of the remaining yttrium (17%) is consumed in ceramics manufacturing (such as YSZ for TBCs) and metallurgy (e.g. in superalloys).

BC coatings, for example the YSZ in TBCs, are responsible for most of the yttrium used in producing engines and turbines. Military and commercial aerospace gas turbine engines can consume up to twenty pounds of yttrium per engine, depending on size, and industrial gas turbines can consume hundreds of pounds of yttrium per turbine. Thousands of new engines and turbines are placed in service in any given year. While this represents a significant volume of yttrium per year, it is estimated that more BC coatings, and therefore more yttrium, are applied to repair and replacement parts than to parts of new engines and turbines. This fact results from the long in-service life of engines and turbines (up to 30+ years) combined with the relatively short frequency of rebuilds (as low as 3-6 k in-service hours).

BCs are applied by processes including air plasma spray (APS) and electron beam physical vapor deposition (EB-PVD) which each produce a different coating morphology as needed by different hot components. Unfortunately, these processes can be very inefficient—coating yields can be as low as 5-20% depending on the part being coated and application process—the majority of the BC never sees use. A small amount of BC from select operations is recycled but most overspray is collected and disposed of as waste.

Thus, the present disclosure provides methods to improve the overall process efficiency and address diminishing yttrium sources, for example, reuse of BC overspray and recovery of yttrium from service parts. As provided by the present disclosure, the reuse and recovery processes not only targets BCs consumed in new manufacturing but service components as well, since BC coatings from service and scrap parts represent a sizable portion of total BC and yttrium consumption.

As mentioned above, as much as 80-95% of BC is typically wasted in the manufacturing process. While it would seem that a simple solution to the problem would be to segregate overspray powders for collection and recycling by conventional means, it often is not practical in a manufacturing environment. Manufacturing sites and service shops often have a limited number of spray cells and use a variety of different coating chemistries with specific particle size distributions. Production time requirements often dictate that multiple coatings are sprayed in the same booth. As such, the overspray for a given booth can contain a variety of coating components (i.e. bond coat and YSZ) as well as contaminants (metal chips, dirt, dust, etc.). That composition will vary with time depending on production needs, which adds technical difficulty. Development and implementation of TBC overspray reuse processes (either directly or as a feedstock for YSZ powder manufacturing) could help offset diminishing yttrium supplies by as much as 80-95%.

The methods of the present disclosure also provide for recovery of yttrium from service parts. Service parts present an additional opportunity to recover yttrium from parts being serviced for rebuilds and end of life components. In various service operations, parts that will be reused must have existing BC coatings stripped prior to rework. BC stripping is accomplished via chemical (acid etches) or physical (grit blasting) processes. These stripped BCs typically aren't recovered and end up as waste. As provided by the methods of the present disclosure, the implementation of new BC stripping and yttrium recovery processes could help offset diminishing yttrium supplies by as much as 5-20%, especially if these techniques are applied to end-of-life components prior to base metal recycling.

The methods of the present disclosure can be used along with the BC applications as described herein, thereby enabling the recovery, recycling, and reuse of BCs, which is of major importance and value. The methods of the present disclosure are particularly useful since they work within the constraints of a modern manufacturing environment and address the above mentioned sources (APS and EB-PVD overspray as well as physically and chemically stripped coatings).

Figure 4:
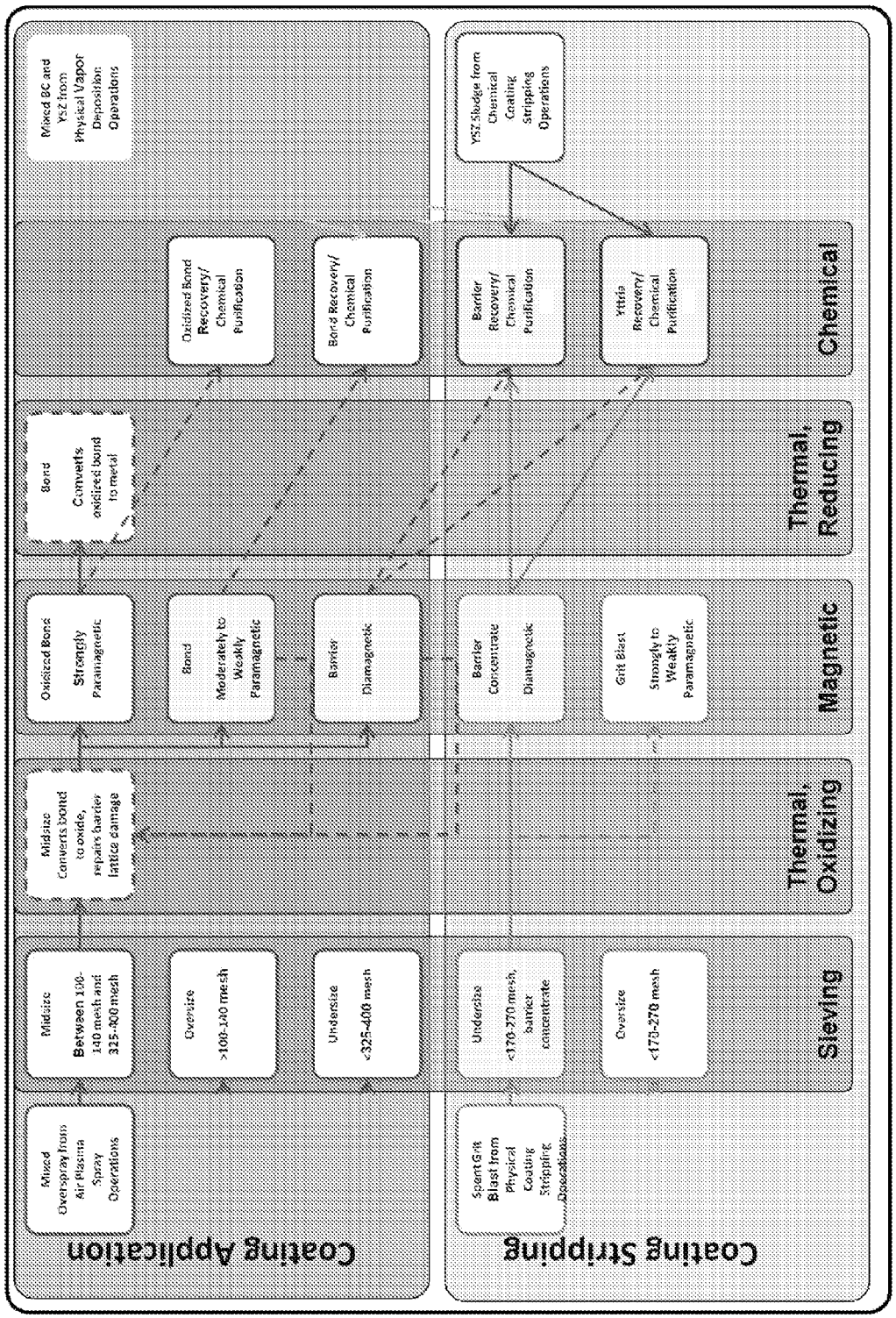
FIG. 4 is a chart showing embodiments of the present disclosure of an overall process for the recovery and reuse of barrier coat, bond coat, and constituents of the barrier coat and bond coat.

To address the wasteful nature of the barrier coat application and stripping processes, the present disclosure provides, in one aspect, a series of methods to separate individual constituents of bond coat and barrier coat to enable reuse and recycling. FIG. 4 illustrates one embodiment of an overall pathway for integrating the methods of the present disclosure into the recovery and reuse of BCs, bond coatings, and individual constituents thereof. As can be seen in FIG. 4, various physical and chemical processes can be performed individually or combined to enable reuse or recycling of overspray and end-of-life coatings. Various particular embodiments of these process steps are described herein.

In one aspect of the present disclosure is a method for recovering bond coat and thermal barrier coat materials from overspray waste containing co-mingled bond coat and thermal barrier coat materials. This method involves providing an overspray waste comprising co-mingled bond coat and thermal barrier coat materials, wherein the bond coat material comprises a weakly paramagnetic bond coat component and a strongly paramagnetic bond coat oxide component. A weak paramagnetic field is applied to the overspray waste under conditions effective to yield a paramagnetic fraction comprising the strongly paramagnetic bond coat oxide component and a weakly/non-paramagnetic fraction comprising the weakly paramagnetic bond coat component co-mingled with the diamagnetic thermal barrier coat material. The weakly/non-paramagnetic fraction is then subjected to a magnetic field under conditions effective to separate the bond coat component from the diamagnetic thermal barrier coat material.

In certain embodiments, the step of providing the overspray waste comprises collecting co-mingled excess bond coat material and thermal barrier coat material from air plasma spray and/or electron beam physical vapor deposition processes. In one embodiment, the bond coat material and the thermal barrier coat material each comprises yttrium. In a particular embodiment, the bond coat material comprises MCrAlY, wherein M is Fe, Ni, or Co. In another embodiment, the thermal barrier coat material comprises yttria stabilized zirconia.

In certain embodiments, the method of recovering bond coat and thermal barrier coat materials from overspray waste can further comprise: removing debris from the overspray waste through size exclusion prior to applying the paramagnetic field to the overspray waste. As provided herein, the term "debris" generally refers to any material that is included in the overspray waste or mixture of co-mingled bond coat and barrier coat materials stripped from a substrate and that is neither a bond coat material nor a barrier coat material (e.g., a thermal barrier coat material). For example, debris can include, without limitation, materials such as dirt, dust, metal chips, wood pieces, insects, and the like. In a particular example, debris can include, without limitation, any particle that is about 0.15 millimeters or greater in size that is neither a bond coat material nor a barrier coat material.

Sieving

Referring again to FIG. 4, various aspects of sieving are depicted for coating applications and coating stripping. In one embodiment, the debris is removed by passing the overspray waste through a sieving system in order to separate the debris from the co-mingled bond coat and thermal barrier coat materials. Suitable sieving systems can comprise a sieve that traps debris and allows the co-mingled bond coat and thermal barrier coat materials to pass therethrough. In one embodiment, the sieve has a mesh size of between about 100 and about 200. In a particular embodiment, the sieve has a mesh size of about 140.

Air Plasma Overspray: Air plasma coating overspray is typically drawn from a coating cell into collection system. The process is non-selective, so other contaminants can find their way into the overspray powder (bugs, metal chips, wood pieces, etc.). Sieving provides a good means to eliminate these bulk contaminants from the much finer overspray powders. For example, samples of air plasma overspray containing bond coat and barrier coat were sieved through 100-120 mesh sieves as an initial purification process. Oversize material from the sieving can be disposed of, however; if it is determined to contain valuable material it could be recycled or subjected to chemical recovery.

One embodiment of this sieving separation is shown in FIG. 1 that illustrates the particle size distribution obtained after plasma residue containing bond coating and thermal barrier coating is processed through the sieving system. In this example, plasma residue was sieved through 35, 45, 60, 80, 100, 120, 140, 170, 200, 230, and 270 mesh sizes using a Retsch Sieve Shaker. The larger particle sizes (>140 mesh) contained mostly contaminants, while the smaller particle sizes (<=140 mesh) contained the BC and TBC.

The material on the 0.15 mm sieve, representing less than one percent of the total sample weight was disposed of The smaller particle sized material consists of a mixture of bond and barrier coats, whatever was sprayed in the cell prior to the sample being taken.

Spent Grit Blast: Physical stripping processes often use aluminum oxide grit blast to remove coatings from parts prior to repair or base-metal recycling. These grit blasts strip barrier coatings and some bond coat from the base metal part by pulverizing it into a fine dust. In the process, some of the grit blast is broken down into smaller pieces. By performing sieving, the fine particulates containing barrier coat can be separated from the bulk grit blast such as illustrated in FIG. 5.

Figure 5:
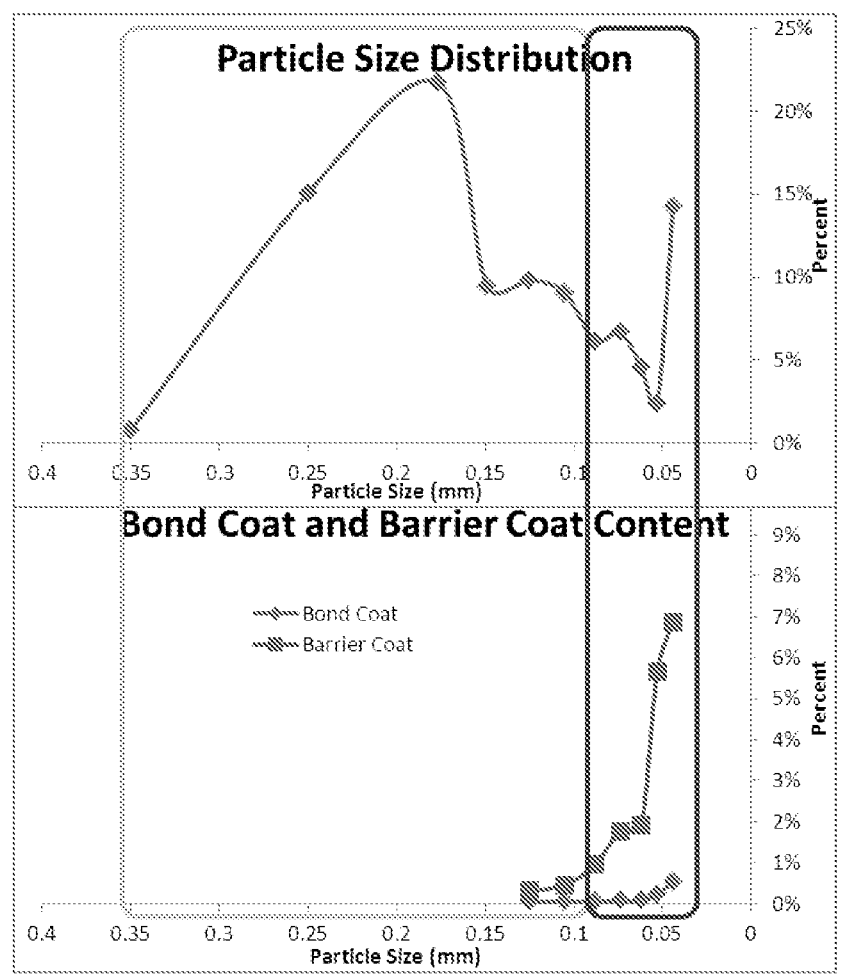
FIG. 5 show graphs relating to the particle size distribution and bond coat and barrier coat content from spent grit blast stripping processes.

As shown in FIG. 5, the top graph is a plot of weight % versus particle size and the lower graph is a plot of barrier coat and bond coat content versus particle size. The majority of particles are larger than 0.15 mm and contain little or no barrier coat (larger particle sizes contained no visual trace of barrier coat and were not analyzed). Advantageously, this grit blast (~60 wt %) can be reused in the grit blast process, minimizing process waste. The smaller particles, less than about 0.15 mm, contain the stripped barrier coat and bond coat. The concentration of the stripped coatings increases with decreasing particle size. This preconcentrated material advantageously serves as a useful feedstock for chemical recovery of precious materials contained therein.

Thermal Treatment

As shown in FIG. 4, the mixture of co-mingled bond coat and barrier coat materials can be heated to a temperature effective to facilitate separation of the bond coat and the barrier coat material. In a particular embodiment, a suitable heating temperature is above 400° C. In another particular embodiment, a suitable heating temperature is any temperature between 400° C. and 750° C. In addition, heat treatments after separation can be used to reduce any oxidized metals to their zero valence state. These heat treatments can be performed under controlled atmosphere (for example, oxidizing or reducing conditions) as necessary to improve separation. In one non limiting example, comingled bond and barrier coat that was magnetically inseparable was heated at 750° C. for three hours with a three hour ramp to temperature and a three hour ramp back to ambient temperature. After this heat treatment, it was possible to separate the two fractions from each other.

Magnetic Separation

As set forth herein, the methods of the present disclosure use magnetic separation to isolate various fractions from the BC/bond coat overspray waste and from co-mingled bond coat and barrier coat materials stripped from substrates, such as illustrated in FIG. 4. While not intending to be limited thereto, various magnetic separation techniques typically involve magnets and magnetic separators known in the art, including, for example, those described in U.S. Pat. Nos. 4,235,710, 5,049,540, and 5,968,820.

In certain embodiments, the step of applying the paramagnetic field comprises exposing the overspray waste to at least one magnet that attracts the strongly paramagnetic bond coat oxide component, thereby separating the paramagnetic fraction from the weakly/non-paramagnetic fraction. In one embodiment, the magnet provides a field equivalent to the magnetic field generated by a magnetic separator (e.g., a Frantz LB-1) operating at a current between about 0.001 and about 0.15 amps. In one embodiment, the step of applying the magnetic field to the overspray waste is repeated one or more times prior to the step of subjecting the weakly/non-paramagnetic fraction to the magnetic field.

In certain embodiments, the step of subjecting the weakly/non-paramagnetic fraction to a magnetic field comprises exposing the weakly/non-paramagnetic fraction to a magnet that attracts the weakly paramagnetic bond coat component, thereby separating the bond coat component from the diamagnetic thermal barrier coat material. In a particular embodiment, the magnet provides a field equivalent to the magnetic field generated by a magnetic separator (e.g., a Frantz LB-1) operating at a current greater than about 0.15 amps. In one embodiment, the step of subjecting the weakly/non-paramagnetic fraction to the magnetic field is repeated one or more times.

As provided in various embodiments, the present disclosure involves the use of magnets that provide a field equivalent to a magnetic field generated by a magnetic separator (e.g., a Frantz magnetic separator) operating at a particular current. In a particular embodiment, the current in amps is as measured at a ramp longitudinal incline of 5-25 degrees and an axial tilt of 0-25 degrees. Ramp longitudinal incline is measured relative to the length of the separation chute along which the particles travel (horizontal is 0 degrees slope) and axial tilt is measured relative to the width of the separation chute (horizontal is 0 degrees tilt).

Magnetic Separation of Air Plasma Overspray: In a particular embodiment relating to magnetic separation of air plasma overspray, mixed bond coat and barrier coat overspray that has been sieved can be separated into individual powders using magnetic separation. For example, a five gallon pail of mixed plasma overspray can be used from a bag house dust collector attached to air plasma spray coating cells. These coating cells are arbitrarily used to spray various bond coat and barrier coat powders, so the sample can contain a mixture of whatever was sprayed in the coating cell.

In a particular example, 108.3 g of mixed plasma overspray was sampled from the five-gallon pail. This plasma overspray was passed through a 120 mesh sieve to bulk remove contaminants (large chips, dust, debris, etc.). The contaminants represented less than 1 wt % of the total material and were disposed of as waste. The sieved sample was passed through a Frantz LB-1 Electromagnetic Separator, although other magnetic separators that function like the Frantz LB-1 Electromagnetic Separator can be used. For the separation of overspray materials, field (amps), ramp longitudinal incline (degrees) and axial tilt (degrees) conditions can include, but are not limited to, the conditions set forth in FIG. 6.

As set forth in FIG. 6, the weight of material separated for each condition and percent of the original sample are in the columns on the right. The materials can be passed through one time for each of the above settings, starting with the lowest field (low amps) and progressing through higher and higher fields. Unexpectedly, various materials are able to be separated at different magnetic field strengths.

Figure 7:
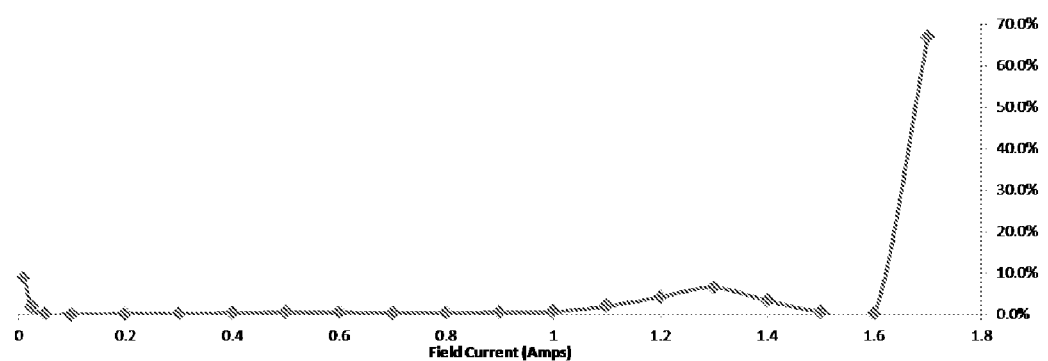
FIG. 7 is a graph showing percentages of each fraction based on field current (amps) resulting from the performance of one embodiment of the present disclosure relating to magnetic separation of air plasma overspray.

The percentages of each fraction are displayed in the chart of FIG. 7 (samples run at tilt angles below 15 degrees are combined and displayed as 1.7 amps, since decreasing the tilt angle is in effect similar to increasing the field strength, and this allows the fractions to be displayed on the same chart). It can be seen that the separation achieved three major fractions (>2 wt %), one below about 0.1 amps, one between about 1.0 and 1.5 amps and one above about 1.6 amps. The separation of three major fractions was unexpected, since only two different coating types (NiCrAlY bond coat and YSZ barrier coat) are applied in this spray cell.

According to the present disclosure, further analysis shows why three fractions were able to be separated. For example, the below 0.1 amps, 1.0 and 1.5 amp, and above 1.6 amp fractions were combined and analyzed using X-ray Fluorescence (XRF). The results are displayed in the Table 1, as follows:

TABLE 1

| Fraction (Amps) | >0.1 | 1.0 to 1.5 | >1.6 |
|---|---|---|---|
| Barrier | 1% | 1% | 98% |
| Bond | 99% | 99% | 2% |

As shown in Table 1, the >0.1 amp fraction was found to be 99% bond coat material, which is unexpected, as bond coat materials are not considered strongly paramagnetic.

Further analysis showed a large concentration of oxygen, which is attributed to partial or full oxidation of this bond coat material. This result was also highly unexpected, as these bond coat materials are not thought to oxidize under the air plasma spray conditions. This finding explains the strongly paramagnetic nature of the 0.1 amp fraction. The separation described herein enables the enhanced recycling of all of these materials, since oxidized bond coat are typically recycled using a different process than non-oxidized bond coat. In addition YSZ barrier coat are typically recycled using a different process than both oxidized and unoxidized bond coat. The 1.0 to 1.5 amp fraction was found to contain 99% bond coat and the >1.6 fraction was found to contain 98% barrier coat. Therefore, the present techniques enable the direct reuse of these materials if sufficient purity can be achieved. According to the methods of the present disclosure, it is possible to achieve 98-99% purity of the separated fractions. Multiple passes under the same magnet conditions would increase the separation efficiency, resulting in higher purity for a given fraction.

The present disclosure also contemplates that the conditions referred to herein can be used on other waste air plasma spray powders. For example, another sample of mixed plasma overspray powder can be obtained from a Donaldson Torit bag house dust collector attached to air plasma spray coating cells. These coating cells are arbitrarily used to spray various bond coat and barrier coat powders, so the sample contained a mixture of whatever was sprayed in the coating cell. In a particular example, 110.5 g of mixed plasma overspray can be sampled from the sample container. This plasma overspray can then be passed through a 120 mesh sieve to bulk remove contaminants (large chips, dust, debris, etc.). In one example, the contaminants represented less than 1 wt % of the total material and were disposed of as waste. The sieved sample can then be passed through a Frantz LB-1 Electromagnetic Separator, although other magnetic separators that function like the Frantz LB-1 Electromagnetic Separator can be used. For the separation of overspray materials, field (amps), ramp longitudinal incline (degrees) and axial tilt (degrees) conditions can include, but are not limited to, the conditions set forth in FIG. 8.

Figure 9:
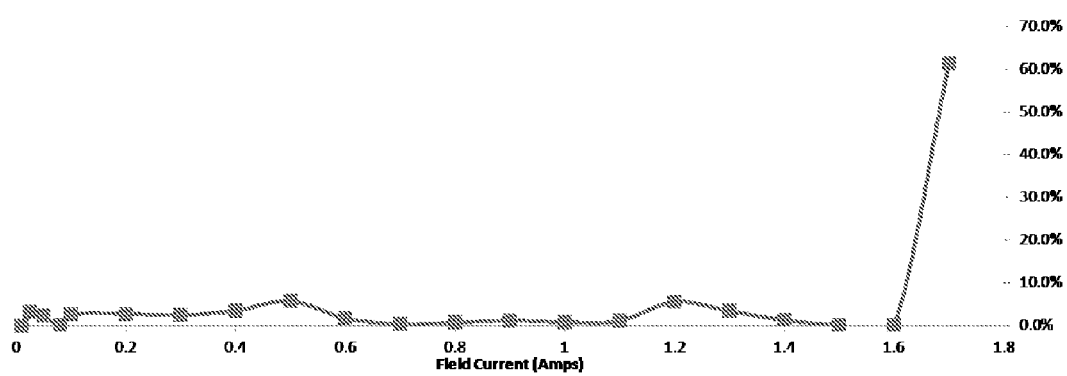
FIG. 9 is a graph showing percentages of each fraction based on field current (amps) resulting from the performance of one embodiment of the present disclosure relating to magnetic separation of air plasma overspray.

As shown in FIG. 8, the weight of material separated for each condition and percent of the original sample are in the columns on the right. In this example, the sample contained many different plasma spray powders of differing elemental purity so the materials were passed through multiple times for each of the above settings, starting with the lowest field (low amps) and progressing through higher and higher fields. As demonstrated in the previous experiment, various materials were separated at different magnetic field strengths. The percentages of each fraction are displayed in the chart of FIG. 9 (samples run at tilt angles below 15 degrees are combined and displayed as 1.7 amps, since decreasing the tilt angle is in effect similar to increasing the field strength, and this allows the fractions to be displayed on the same chart). As shown in FIG. 9, it can be seen that the separation achieved four major fractions (>2 wt %), one below 0.1 amps, one between 0.1 and 0.6 amps, one between 1.0 and 1.5 amps, and one above 1.6 amps. According to the present disclosure, the separation of four major fractions was expected as a result of the prior experiment and since this sample contained many different plasma spray powders of differing elemental purity.

According to the present disclosure, further analysis illustrates why these fractions were able to be separated. The sub 0.1 amps, 0.1 to 0.6 amps, 1.2 to 1.3 amps, and above 1.6 amp fractions were analyzed using XRF. The results are displayed in the Table 2 below:

TABLE 2

| | Fraction (Amps) | | | | | | | | | | |
|---|---|---|---|---|---|---|---|---|---|---|---|
| | 0.025 | 0.05 | 0.1 | 0.2 | 0.3 | 0.4 | 0.5 | 0.6 | 1.2 | 1.3 | 1.6 |
| Barrier | 5% | 9% | 74% | 82% | 89% | 91% | 87% | 78% | 14% | 24% | 97% |
| Bond | 95% | 91% | 26% | 18% | 11% | 9% | 13% | 22% | 86% | 76% | 3% |

As shown in Table 2, the >0.1 amp fraction was found to be primarily bond coat material, which again, would be unexpected, as bond coat materials should not be strongly paramagnetic. As before, further analysis showed a large concentration of oxygen, which is attributed to partial or full oxidation of this bond coat material. Again, as provided by the present disclosure, this result was highly unexpected, as it is not known that these bond coat materials oxidize under the air plasma spray conditions. This finding explains the strongly paramagnetic nature of the 0.1 amp fraction. The 0.1 to 0.6 amp fractions contained a blend of bond coat and barrier coat. Since these materials have similar magnetic properties, it is not possible to separate them magnetically. Instead, this fraction can be separated by another technique, for example, using density or by chemical means. The 1.2 to 1.3 amp fraction also found to contain a mix of bond coat and barrier coat materials. As with the 0.1 to 0.6 amp fraction, these materials must have similar magnetic properties, it is not possible to separate them magnetically. Instead, this fraction can be separated by another technique, for example using density or by chemical means. Both approaches can be used, a density separation yielded separated bond coat and barrier coat materials. Chemical separation (as described herein) can also work to separate the bond coat from the barrier coat. In one example, the >1.6 amp fraction was found to contain 97% barrier coat. Therefore, the present techniques can enable the direct reuse of these materials if sufficient purity is achieved.

The separation described herein enables the enhanced recycling of the oxidized bond coat and YSZ barrier coat materials, since oxidized bond coat typically are recycled using a different process than YSZ barrier coat. In particular, this disclosure enables the direct reuse of these materials if sufficient purity is achieved. Using the methods of the present disclosure, 98-99% purity of the separated fractions can be achieved. Also, in accordance with the present disclosure, multiple passes under the same magnet conditions can be performed to increase the separation efficiency, resulting in higher purity for a given fraction. Again, multiple passes under the same magnet conditions would be expected to increase the separation efficiency, resulting in higher purity for a given fraction.

Spent Grit Blast: Since magnetic separation using the conditions described above can be effective for the separation of oxidized bond coat, bond coat, and YSZ barrier coat, the present disclosure also provides that magnetic separation can be used to further separate grit blast from bond and barrier coat in spent grit blast.

Another aspect of the present disclosure is a collection of reusable fractions isolated from overspray waste containing co-mingled bond coat and thermal barrier coat materials according to the method of recovering bond coat and thermal barrier coat materials from overspray waste, the collection comprising: (i) a first fraction comprising a paramagnetic bond coat oxide component isolated from the overspray waste; (ii) a second fraction comprising a diamagnetic bond coat component isolated from the overspray waste; and (iii) a third fraction comprising a thermal barrier coat material isolated from the overspray waste, wherein each of the first, second, and third fractions is separate from one another.

Another aspect of the present disclosure is a method for recovering bond coat and thermal barrier coat materials from a mixture of co-mingled bond coat and thermal barrier coat materials stripped from a substrate, the method comprising: (i) providing a mixture of co-mingled bond coat and thermal barrier coat materials stripped from a substrate, wherein the bond coat material comprises a diamagnetic barrier coat component and a paramagnetic bond coat component; (ii) applying a magnetic field to the mixture under conditions effective to yield a paramagnetic fraction comprising the paramagnetic bond coat component and a non-paramagnetic fraction comprising the diamagnetic thermal barrier coat material and potentially grit blast material; and (iii) subjecting the non-paramagnetic fraction to a magnetic field under conditions effective to separate the diamagnetic thermal barrier coat material from the grit blast material.

In certain embodiments, the step of providing the mixture of co-mingled bond coat and thermal barrier coat materials comprises stripping the thermal barrier coat and at least a portion of the bond coat material from the substrate by chemical acid etching or physical removal processing. In a particular embodiment, said physical removal processing comprises grit blasting.

Another aspect of the present disclosure is a collection of reusable fractions isolated from a mixture of co-mingled bond coat and thermal barrier coat materials stripped from a substrate according to the method for recovering bond coat and thermal barrier coat materials from a mixture of co-mingled bond coat and thermal barrier coat materials stripped from a substrate, the collection comprising: (i) a first fraction comprising a paramagnetic bond coat component isolated from the mixture; (ii) a second fraction comprising a diamagnetic thermal barrier coat material isolated from the mixture; and (iii) a third fraction comprising grit blast material, wherein each of the first, second, and third fractions is separate from one another.

Another aspect of the present disclosure is a method for recovering yttrium from a barrier coat stripped from a metal substrate, the method comprising: (i) stripping a barrier coat from a metal substrate to yield a mixture comprising the stripped barrier coat co-mingled with one or more of a bond coat material and a byproduct of the stripping process, wherein said bond coat material comprises one or both of a diamagnetic barrier coat component and a paramagnetic bond coat component; (ii) applying a magnetic field to the mixture under conditions effective to yield a paramagnetic fraction comprising the paramagnetic bond coat component and a non-paramagnetic fraction comprising the diamagnetic barrier coat component co-mingled with the physical separation media; (iii) subjecting the non-paramagnetic fraction to a magnetic field under conditions effective to separate the diamagnetic barrier coat component from the physical separation media; and (iv) recovering yttrium from the barrier coat.

In certain embodiments, the step of stripping the barrier coat from the metal substrate comprises chemical acid etching or physical removal processing. In a particular embodiment, the physical removal processing can include, without limitation, grit blasting.

Chemical Purification

In cases where further purification is desired to achieve the purity necessary for reuse or recycling, chemical purification may be used to improve purity or extract the desirable materials.

Therefore, in certain embodiments, the method of recovering bond coat and thermal barrier coat materials from overspray waste or from co-mingled bond coat and barrier coat materials stripped from a substrate can further comprise: purifying, by way of chemically processing (e.g., chemical purification), one or more of the paramagnetic bond coat oxide component, the diamagnetic bond coat component, or the barrier coat material (e.g., thermal barrier coat material) isolated from the overspray waste or mixture of co-mingled bond coat and barrier coat materials stripped from a substrate.

Similarly, in certain embodiments, the method and any related steps involving recovering yttrium from the barrier coat can comprise a chemical treatment process effective to isolate the yttrium from the barrier coat.

EXAMPLES

The techniques, having been generally described, may be more readily understood by reference to the following examples, which are included merely for purposes of illustration of certain aspects and embodiments, and are not intended to limit the system and methods in any way.

Example 1

In this example a co-mingled bond coat and thermal barrier coat materials were recovered according to a particular embodiment of the method of the present disclosure. The plasma residue composition was found to comprise about 1% of various debris that finds its way into the collection basin, about 33% bond coat, and about 66% thermal barrier coating. This debris is removed by sieving with 140 mesh to separate out about 1% as large particles of about 100 um or larger, and 99% as small particles of about 100 um or smaller.

This 99% first fraction, which contained NiCrAlY oxide and other bond coat oxide matter, was further separated by paramagnetic separation using at least one magnet. The separation resulted in about 11% as magnetic material and about 88% was recovered as non-magnetic material. The non-magnetic material, which now contained NiCrAlY and other bond coat materials, was further separated using diamagnetic separation to obtain about 21% of material that is diamagnetic and about 79% of material that is non-diamagnetic. This final step allows for the separation and recovery of yttria stabilized zirconia.

For the sieving, plasma residue containing BC and TBC is processed through a sieving system. Plasma residue was sieved through 35, 45, 60, 80, 100, 120, 140, 170, 200, 230, and 270 mesh sieves using a Retsch Sieve Shaker. The particle size distribution obtained is shown in FIG. 1. The larger particle sizes (>140 mesh) contained mostly contaminants, while the smaller particle sizes (<=140 mesh) contained the BC and TBC. In this example, only the <=140 mesh material was processed further (i.e., the 99% fraction).

For the paramagnetic separation, oxidized BC material is paramagnetic and is separated from non-oxidized BC and TBC using a magnet. Paramagnetic BC material was separated from the sieved BC and TBC fractions using a rare earth magnet. The particle size distribution obtained is shown in FIGS. 2A-2C. These figures are graphs and charts showing the particle size distribution obtained after parametric oxidized bond coat material is separated from non-oxidized bond coat and thermal barrier coating using a magnetic field. Fractions of elements according to particle size are shown in FIGS. 2A-2C. The particle size distribution of paramagnetic and non-paramagnetic material is similar, with the exception that there is more non-paramagnetic at smaller particles sizes. Only the <=140 mesh material was processed further. The XRF analysis of the paramagnetic fraction is consistent with high purity NiCrAlY bond coat that has been converted to metal oxides. As depicted, less than 1% TBC is present. The XRF analysis of the non-paramagnetic fraction is consistent with a blend of high purity elemental NiCrAlY bond coat combined with high purity yttria stabilized zirconia TBC, wherein the yield is about 100%. In one example, the yield was 11% bond coat oxide, and 88% mixture of bond coat and thermal barrier coat.

Figures 3A, 3B, 3C:
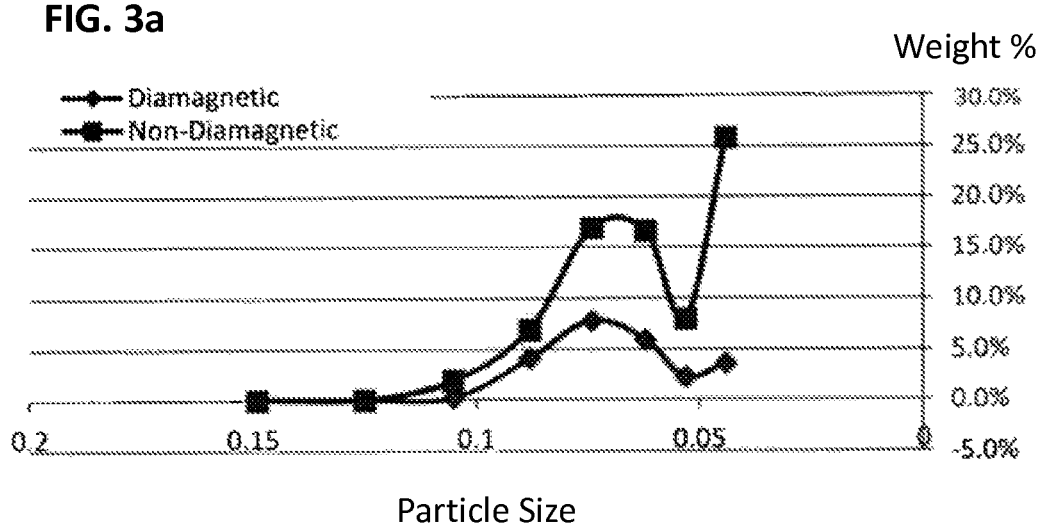
FIGS. 3A-3C are graphs and charts the particle size distribution and elemental compositions as measured by X-ray fluorescence (XRF) obtained after diamagnetic non-oxidized bond coat material is separated from oxidized bond coat and thermal barrier coating using an electromagnetic field according to one embodiment.

For the diamagnetic separation, non-oxidized BC material is diamagnetic and is separated from TBC using an electromagnetic field generator. Diamagnetic BC material was separated from TBC fractions using an electromagnetic separator. The particle size distribution obtained is depicted in FIGS. 3A-3C which are graphs and charts for the particle size distribution obtained after diamagnetic non-oxidized bond coat material is separated from oxidized bond coat and thermal barrier coating using an electromagnetic field. Fractions of elements according to particle size are shown in these figures.

The XRF analysis of the diamagnetic fraction is consistent with high purity NiCrAlY bond coat, and approximately 1% TBC is present. The XRF analysis of the non-diamagnetic fraction is consistent with a blend of high purity elemental NiCrAlY bond coat, and approximately 1% of bond coat is present. The yield is about 100%. In one example, the yield was 24% bond coat, and 76% thermal barrier coat.

Additional processes such as pre and post treatment can be optionally performed. For example, non-oxidized BC material can be converted to oxidized BC to enable separation from TBC using an electromagnetic field generator. Oxidation may be chemical or via heating in an oxidizing atmosphere. Some contaminants can be removed by calcining at high temperature (e.g. >750° C. for carbon-based contaminants). Washing can also remove soluble contaminants. In certain embodiments a reducing atmosphere converts the BC oxides back to BC.

Example 2

Chemical Purification

In cases where non-chemical purification processes are not sufficient to achieve the purity necessary for reuse or recycling, chemical purification may be used to improve purity or extract the desirable materials. Referring to FIG. 4, there are several illustrated chemical purification options depicted. A matrix of different acids were evaluated, including mixtures of acids to determine their utility for purifying various samples. It was discovered that certain chemical processes were unexpectedly advantageous for recovering specific materials from certain samples.

Chemical Treatment to Recover Nickel and Yttrium from Oxidized Bond Coat

The oxidized bond recovery/chemical purification option is shown in FIG. 4. The sub 0.1 amps fraction of magnetically separated material contains a high concentration (~99%) of oxidized bond coat material. Nickel is present in the highest concentration (up to 66%) in this material and also has the most value compared to the constituents by weight. Yttrium is contained in lower concentrations (1-2%) but also has a high value. Nitric acid, aqua regia, and hydrochloric acid treatment selectively solubilizes nickel and yttrium and leaves most of the aluminum and chromium behind. As an example, a sample of sub 0.1 amps magnetically separated material was analyzed via XRF and found to have a metallic composition of 60% nickel, 24% chromium, 14% aluminum, 2% yttrium, and <1% zirconium (this is a typical bond coat composition with some barrier coat contamination). This sample was used in the following experiments.

Nitric Acid Test

A 0.2178 g portion of the above sample was treated at 60 degrees C. for 8 hours in nitric acid. After treatment, the sample was centrifuged and the supernatant was removed and analyzed via Inductively Coupled Plasma Optical Emission Spectroscopy (ICP-OES) It was found that 25.8% of the sample dissolved comprised of 25.4% nickel, 0.1% aluminum, 0.0% chromium, 0.1% yttrium, and 0.0% zirconium. This equates to the metal content in the supernatant as being 98% nickel and less than 2% other materials. This is a nearly quantitative extraction that produces a high nickel purity solution. The nickel in this solution can be recovered by electrowinning or other known techniques. These results are unexpected, given the results of other tests performed with the same sample (e.g. sulfuric acid).

Aqua Regia Test

A 0.2196 g portion of the above sample was treated at 60 degrees C. for 8 hours in aqua regia. After treatment, the sample was centrifuged and the supernatant was removed and analyzed via ICP-OES. It was found that 50.8% of the sample dissolved comprised of 48.3% nickel, 0.6% aluminum, 0.2% chromium, 1.2% yttrium, and 0.0% zirconium. This equates to the metal content in the supernatant as being 95% nickel, 1% aluminum, 2% yttrium, and less than 2% other materials. This is a nearly quantitative extraction that produces a high nickel purity solution. The nickel and yttrium in this solution can be recovered by electrowinning or other known techniques. These results are unexpected, given the results of other tests performed with the same sample.

Hydrochloric Acid Test

A 0.2009 g portion of the above sample was treated at 60 degrees C. for 8 hours in hydrochloric acid. After treatment, the sample was centrifuged and the supernatant was removed and analyzed via ICP-OES. It was found that 30.2% of the sample dissolved comprised of 28.6% nickel, 0.3% aluminum, 0.1% chromium, 0.9% yttrium, and 0.0% zirconium. This equates to the metal content in the supernatant as being 95% nickel, 1% aluminum, 3% yttrium, and less than 1% other materials. This is a relatively high nickel purity solution and nickel and yttrium in this solution can be recovered by electrowinning or other known techniques.

Sulfuric Acid Test

A 0.2153 g portion of the above sample was treated at 60 degrees C. for 8 hours in sulfuric acid. After treatment, the sample was centrifuged and the supernatant was removed and analyzed via ICP-OES. It was found that 0.9% of the sample dissolved comprised of 0.4% nickel, 0.1% aluminum, 0.1% chromium, 0.1% yttrium, and 0.0% zirconium. This equates to the metal content in the supernatant as being 46% nickel, 6% aluminum, 7% chromium, 11% yttrium, and less than 2% other materials. This is a lower purity nickel and yttrium solution that less amenable to recovery by electrowinning or other known techniques. Thus, sulfuric acid had a lower dissolution percent for nickel recovery.

Acid Mixture Test (110R1)

A 0.2264 g portion of the above sample was treated at 60 degrees C. for 8 hours in an acid mixture comprised of 33% by weight 98% sulfuric acid, 33% ammonium bifluoride, and 33% water. After treatment, the sample was centrifuged and the supernatant was removed and analyzed via ICP-OES. It was found that 1.0% of the sample dissolved comprised of 0.2% nickel, 0.1% aluminum, 0.1% chromium, 0.0% yttrium, and 0.2% zirconium. This equates to the metal content in the supernatant as being 24% nickel, 10% aluminum, 13% chromium, 2% yttrium, and 18% zirconium. This is a lower purity nickel and yttrium solution and less amenable to recovery by electrowinning or other known techniques. Thus, 110R1 acid had a lower dissolution percent for nickel recovery.

Acid Mixture Test (ACR1)

A 0.1065 g portion of the above sample was treated at 60 degrees C. for 8 hours in an acid mixture comprised of 71% by weight 34% hexafluosilicic acid, 24% phosphoric acid, and 5% hydrochloric acid. After treatment, the sample was centrifuged and the supernatant was removed and analyzed via ICP-OES. It was found that 17.7% of the sample dissolved comprised of 15.3% nickel, 0.5% aluminum, 0.1% chromium, 1.0% yttrium, and 0.1% zirconium. This equates to the metal content in the supernatant as being 87% nickel, 3% aluminum, 1% chromium, 6% yttrium, and 1% zirconium. This is a lower purity nickel and yttrium solution and less amenable to recovery by electrowinning or other known techniques. Thus, ACR1 acid had a lower dissolution percent for nickel recovery.

27% Ammonium Bifluoride

A 0.2200 g portion of the above sample was treated at 60 degrees C. for 8 hours in 27% ammonium bifluoride in water. After treatment, the sample was centrifuged and the supernatant was removed and analyzed via ICP-OES. It was found that 2.1% of the sample dissolved comprised of 1.2% nickel, 0.1% aluminum, 0.1% chromium, 0.0% yttrium, and 0.2% zirconium. This equates to the metal content in the supernatant as being 59% nickel, 3% aluminum, 4% chromium, 0% yttrium, and 9% zirconium. This is a lower purity nickel and yttrium solution that may not be amenable to recovery by electrowinning or other known techniques. Thus, 27% ammonium bifluoride in water had a lower dissolution percent for nickel recovery.

Summary

Figure 10:
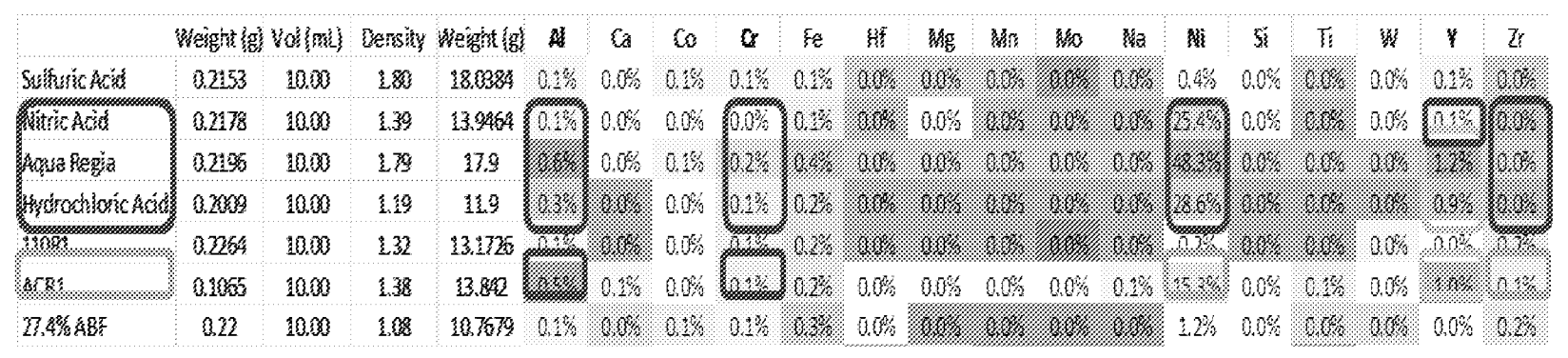

Nitric acid, aqua regia and hydrochloric acid effectively extracted nickel both from a quantitative and qualitative perspective for the oxidized bond recovery/chemical purification processing. These results were unexpected, since nitric acid, aqua regia and hydrochloric acid are known to dissolve metals indiscriminately as is shown in FIG. 10.

Chemical Treatment to Recover Bond Coat Contaminated with Barrier Coat

Referring to FIG. 4, the optional process for bond recovery/chemical purification is depicted. The over 0.1 amps fractions (1.0 and 1.5 amp and above 1.6 amp fractions) were combined and used as a surrogate for contaminated bond coat recovery. This magnetically separated material contains unoxidized bond coat material (~24%) and barrier coat (~76%). Since this bond coat is not oxidized, it can be recycled as bond coat rather than recovering just nickel and yttrium (bond coat is worth more than nickel and yttrium by themselves).

Unexpectedly, treatment of this fraction with mixtures of ammonium bifluoride and water/sulfuric acid selectively solubilizes yttria stabilized zirconium and does not adequately dissolve aluminum, chromium, nickel, and yttrium. As an example, a sample of 1.0 and 1.5 amp and above 1.6 amp fractions magnetically separated material was analyzed via XRF and found to have a metallic composition of 2% aluminum, 5% chromium, 8% nickel, 7% yttrium, and 78% zirconium (this is a typical barrier coat composition with significant bond coat contamination). This sample was used in the following experiments.

27% Ammonium Bifluoride

A 0.2673 g portion of the above sample was treated at 60 degrees C. for 8 hours in 27% ammonium bifluoride in water. After treatment, the sample was centrifuged and the supernatant was removed and analyzed via ICP-OES. It was found that 10.6% of the sample dissolved comprised of 9.8% zirconium, 0.0% aluminum, 0.0% chromium, 0.2% nickel, and 0.0% yttrium. This equates to the metal content in the supernatant as being 92% zirconium, 0% aluminum, 0% chromium, 2% nickel, and 0% yttrium—wherein this mixture is highly selective for zirconium. While this sample in this example contained a large amount of barrier coat, it can be implied from these results that this solution can be used to selectively remove zirconia based barrier coat contamination from bond coat material (for example, if a sample was 99% bond coat and 1% barrier coat, this chemistry would quantitatively remove the barrier coat contamination with minimal bond coat). Since fluoride chemistries are known to dissolve silica, this chemistry would also be useful for removing silica based barrier coat contamination from bond coats.

Acid Mixture Test (149R5)

A 0.2086 g portion of the above sample was treated at 60 degrees C. for 8 hours in an acid mixture comprised of 90% by weight 66% sulfuric acid and 10% ammonium bifluoride. After treatment, the sample was centrifuged and the supernatant was removed and analyzed via ICP-OES. It was found that 6.1% of the sample dissolved comprised of 5.3% zirconium, 0.1% aluminum, 0.1% chromium, 0.3% nickel, 0.1% yttrium from the sample was dissolved. This equates to the metal content in the supernatant as being 87% zirconium, 2% aluminum, 1% chromium, 5% nickel, and 2% yttrium—this acid mixture is highly selective for zirconium. While this sample in this example contained a large amount of barrier coat, it can be implied from these results that this solution can be used to selectively remove zirconia based barrier coat contamination from bond coat material (for example, if a sample was 99% bond coat and 1% barrier coat, this chemistry would quantitatively remove the barrier coat contamination with minimal bond coat). Since fluoride chemistries are known to dissolve silica, this chemistry would also be useful for removing silica based barrier coat contamination from bond coats.

Acid Mixture Test (110R1)

A 0.3701 g portion of the above sample was treated at 60 degrees C. for 8 hours in an acid mixture comprised of 33% by weight 98% sulfuric acid, 33% ammonium bifluoride, and 33% water. After treatment, the sample was centrifuged and the supernatant was removed and analyzed via ICP-OES. It was found that 32.6% of the sample dissolved comprised of 29.1% zirconium, 0.7% aluminum, 1.6% chromium, 0.1% nickel, and 0.0% yttrium. This equates to the metal content in the supernatant as being 89% zirconium, 2% aluminum, 5% chromium, 0% nickel, and 0% yttrium—this mixture is highly selective for zirconium. While this sample in this example contained a large amount of barrier coat, it can be implied from these results that this solution can be used to selectively remove zirconia based barrier coat contamination from bond coat material (for example, if a sample was 99% bond coat and 1% barrier coat, this chemistry would quantitatively remove the barrier coat contamination with minimal bond coat). Since fluoride chemistries are known to dissolve silica, this chemistry would also be useful for removing silica based barrier coat contamination from bond coats.

Acid Mixture Test (ACR1)

A 0.1003 g portion of the above sample was treated at 60 degrees C. for 8 hours in an acid mixture comprised of 71% by weight 34% hexafluosilicic acid, 24% phosphoric acid, and 5% hydrochloric acid. After treatment, the sample was centrifuged and the supernatant was removed and analyzed via ICP-OES. It was found that 20.9% of the sample dissolved comprised of 3.6% zirconium, 1.4% aluminum, 3.7% chromium, 10.4% nickel, and 1.2% yttrium. This equates to the metal content in the supernatant as being 17% zirconium, 7% aluminum, 18% chromium, 49% nickel, and 6% yttrium—this acid mixture is not selective for zirconium and does a satisfactory job of dissolving bond coat. While the ACR1 acid mixture may be useful for removing barrier coat contamination from bond coat, the 27% ammonium bifluoride, 149R5 acid mixture, and 110R1 acid mixture had higher yields for extracting zirconium both from a qualitative and quantitative perspective.

Sulfuric Acid Test

A 0.5093 g portion of the above sample was treated at 60 degrees C. for 8 hours in sulfuric acid. After treatment, the sample was centrifuged and the supernatant was removed and analyzed via ICP-OES. It was found that 0.6% of the sample dissolved comprised of 0.0% zirconium, 0.0% aluminum, 0.1% chromium, 0.2% nickel, and 0.1% yttrium. This equates to the metal content in the supernatant as being 3% zirconium, 7% aluminum, 13% chromium, 28% nickel, and 14% yttrium. Sulfuric acid slightly dissolves the bond coat but does not sufficiently dissolve the barrier coat. As such, sulfuric acid is less effective for removing barrier coat from bond coat.

Nitric Acid Test

A 0.4041 g portion of the above sample was treated at 60 degrees C. for 8 hours in nitric acid. After treatment, the sample was centrifuged and the supernatant was removed and analyzed via ICP-OES. It was found that 1.6% of the sample dissolved comprised of 0.0% zirconium, 0.2% aluminum, 0.1% chromium, 0.9% nickel, and 0.2% yttrium. This equates to the metal content in the supernatant as being 2% zirconium, 11% aluminum, 7% chromium, 57% nickel, and 15% yttrium. Nitric acid slightly dissolves the bond coat but does not sufficiently dissolve the barrier coat. As such, nitric acid is less effective for removing barrier coat from bond coat.

Aqua Regia Test

A 0.2015 g portion of the above sample was treated at 60 degrees C. for 8 hours in aqua regia. After treatment, the sample was centrifuged and the supernatant was removed and analyzed via ICP-OES. It was found that 22.6% of the sample dissolved comprised of 0.0% zirconium, 2.2% aluminum, 4.9% chromium, 14.7% nickel, and 0.4% yttrium. This equates to the metal content in the supernatant as being 0% zirconium, 10% aluminum, 22% chromium, 65% nickel, and 2% yttrium. These concentrations are very close to a typical bond coat composition, so aqua regia dissolves the bond coat indiscriminately, without touching the barrier coat. As such, aqua regia is less effective for removing barrier coat from bond coat.

Hydrochloric Acid Test

A 0.2079 g portion of the above sample was treated at 60 degrees C. for 8 hours in hydrochloric acid. After treatment, the sample was centrifuged and the supernatant was removed and analyzed via ICP-OES. It was found that 16.7% of the sample dissolved comprised of 0.0% zirconium, 1.6% aluminum, 3.6% chromium, 10.9% nickel, and 0.3% yttrium. This equates to the metal content in the supernatant as being 0% zirconium, 10% aluminum, 22% chromium, 65% nickel, and 2% yttrium, identical to the aqua regia results. These concentrations are very close to a typical bond coat composition, so hydrochloric acid dissolves the bond coat indiscriminately, without touching the barrier coat. As such, hydrochloric acid is less effective for removing barrier coat from bond coat.

Summary

As shown in FIG. 11, according to one embodiment, 27% ammonium bifluoride, 149R5 acid mixture, and 110R1 acid mixture had higher yields at extracting barrier coat from bond coat both from a quantitative and qualitative perspective than ACR1 acid mixture, sulfuric acid, nitric acid, aqua regia and hydrochloric acid.

Chemical Treatment to Recover Barrier Coat Contaminated with Bond Coat

Referring again to FIG. 4, the optional process for barrier recovery/chemical purification is depicted. The over 0.1 amps fractions (1.0 and 1.5 amp and above 1.6 amp fractions) were combined and used a surrogate for contaminated barrier coat recovery. This magnetically separated material contains a high concentration of barrier coat and unoxidized bond coat material. Treatment of this fraction with an aqua regia and hydrochloric acid selectively solubilizes aluminum, chromium, nickel, and yttrium and does not dissolve yttria stabilized zirconium. As an example, a sample of 1.0 and 1.5 amp and above 1.6 amp fractions magnetically separated material was analyzed via XRF and found to have a metallic composition of 2% aluminum, 5% chromium, 8% nickel, 7% yttrium, and 78% zirconium (this is a typical barrier coat composition with significant bond coat contamination). This sample was used in the following experiments.

Aqua Regia Test

A 0.2015 g portion of the above sample was treated at 60 degrees C. for 8 hours in aqua regia. After treatment, the sample was centrifuged and the supernatant was removed and analyzed via ICP-OES. It was found that 22.6% of the sample dissolved comprised of 2.2% aluminum, 4.9% chromium, 14.7% nickel, 0.4% yttrium, and 0.0% zirconium. This equates to the metal content in the supernatant as being 10% aluminum, 22% chromium, 65% nickel, 2% yttrium, and 0% zirconium. This composition is very similar to a typical bond coat composition, so aqua regia dissolves the bond coat but not the barrier coat. As such, aqua regia is effective for removing bond coat contamination from barrier coat.

Hydrochloric Acid Test

A 0.2079 g portion of the above sample was treated at 60 degrees C. for 8 hours in hydrochloric acid. After treatment, the sample was centrifuged and the supernatant was removed and analyzed via ICP-OES. It was found that 16.7% of the sample dissolved comprised of 1.6% aluminum, 3.6% chromium, 10.9% nickel, 0.3% yttrium, and 0.0% zirconium. This equates to the metal content in the supernatant as being 10% aluminum, 22% chromium, 65% nickel, 2% yttrium, and 0% zirconium, identical to the aqua regia results. This composition is very similar to a typical bond coat composition, so hydrochloric acid dissolves the bond coat but not the barrier coat. As such, hydrochloric acid is effective for removing bond coat contamination from barrier coat.

Sulfuric Acid

A 0.5093 g portion of the above sample was treated at 60 degrees C. for 8 hours in sulfuric acid. After treatment, the sample was centrifuged and the supernatant was removed and analyzed via ICP-OES. It was found that 0.6% of the sample dissolved comprised of 0.0% aluminum, 0.1% chromium, 0.2% nickel, 0.1% yttrium, and 0.0% zirconium. This equates to the metal content in the supernatant as being 7% aluminum, 13% chromium, 28% nickel, 14% yttrium, and 3% zirconium. Sulfuric acid only slightly dissolves the bond coat. As such, sulfuric acid would be less effective for removing bond coat from barrier coat.

Nitric Acid

A 0.4041 g portion of the above sample was treated at 60 degrees C. for 8 hours in nitric acid. After treatment, the sample was centrifuged and the supernatant was removed and analyzed via ICP-OES. It was found that 1.6% of the sample dissolved comprised of 0.2% aluminum, 0.1% chromium, 0.9% nickel, 0.2% yttrium and 0.0% zirconium. This equates to the metal content in the supernatant as being 11% aluminum, 7% chromium, 57% nickel, 15% yttrium, and 2% zirconium. Nitric acid slightly dissolves the bond coat but does not adequately dissolve the barrier coat. As such, nitric acid would be less effective for removing bond coat from barrier coat Acid Mixture Test (149R5)

A 0.2086 g portion of the above sample was treated at 60 degrees C. for 8 hours in an acid mixture comprised of 90% by weight 66% sulfuric acid and 10% ammonium bifluoride. After treatment, the sample was centrifuged and the supernatant was removed and analyzed via ICP-OES. It was found that 6.1% of the sample dissolved comprised of 0.1% aluminum, 0.1% chromium, 0.3% nickel, 0.1% yttrium, and 5.3% zirconium. This equates to the metal content in the supernatant as being 2% aluminum, 1% chromium, 5% nickel, 2% yttrium, and 87% zirconium—this acid mixture is highly selective for zirconium. As such, 149R5 acid mixture is less effective for removing bond coat contamination from barrier coat.

Acid Mixture Test (110R1)

A 0.3701 g portion of the above sample was treated at 60 degrees C. for 8 hours in an acid mixture comprised of 33% by weight 98% sulfuric acid, 33% ammonium bifluoride, and 33% water. After treatment, the sample was centrifuged and the supernatant was removed and analyzed via ICP-OES. It was found that 32.6% of the sample dissolved comprised of 0.7% aluminum, 1.6% chromium, 0.1% nickel, 0.0% yttrium, and 29.1% zirconium. This equates to the metal content in the supernatant as being 2% aluminum, 5% chromium, 0% nickel, 0% yttrium, and 89% zirconium—this acid mixture is highly selective for zirconium. As such, 110R1 acid mixture is also less effective for removing bond coat contamination from barrier coat.

Acid Mixture Test (ACR1)

A 0.1003 g portion of the above sample was treated at 60 degrees C. for 8 hours in an acid mixture comprised of 71% by weight 34% hexafluosilicic acid, 24% phosphoric acid, and 5% hydrochloric acid. After treatment, the sample was centrifuged and the supernatant was removed and analyzed via ICP-OES. It was found that 20.9% of the sample dissolved comprised of 1.4% aluminum, 3.7% chromium, 10.4% nickel, 1.2% yttrium, and 3.6% zirconium. This equates to the metal content in the supernatant as being 7% aluminum, 18% chromium, 49% nickel, 6% yttrium, and 17% zirconium—this acid mixture is not selective for bond coat and does nearly as good a job of dissolving yttria stabilized zirconium. As such, ACR1 acid mixture is less effective for removing bond coat contamination from barrier coat.

27% Ammonium Bifluoride

A 0.2673 g portion of the above sample was treated at 60 degrees C. for 8 hours in 27% ammonium bifluoride in water. After treatment, the sample was centrifuged and the supernatant was removed and analyzed via ICP-OES. It was found that 10.6% of the sample dissolved comprised of 0.0% aluminum, 0.0% chromium, 0.2% nickel, 0.0% yttrium, and 9.8% zirconium. This equates to the metal content in the supernatant as being 0% aluminum, 0% chromium, 2% nickel, 0% yttrium, and 92% zirconium—this mixture is highly selective for zirconium. As such, 110R1 acid mixture is less effective for removing bond coat contamination from barrier coat.

Summary

As shown in FIG. 12, aqua regia and hydrochloric acid are effective at extracting bond coat contamination from barrier coat both from a quantitative and qualitative perspective. Sulfuric acid and nitric acid did not dissolve enough bond coat to be useful for removing bond coat contamination. 149R5, 110R1, and ACR1 acid mixtures and 27% ammonium bifluoride are more effective at dissolving barrier coat and are therefore not useful for removing bond coat contamination.

Chemical Treatment to Recover Yttria Stabilized Zirconia from Spent Grit Blast

Referring again to FIG. 4, the optional process for yttria recovery/chemical purification is depicted. The small particle size material separated from spent grit blast contains an elevated concentration (1-7%) of barrier coat as shown above. Treatment of this fraction with fluoride-based acid mixtures selectively solubilizes yttria stabilized zirconium and doesn't dissolve aluminum, chromium, nickel, metallic yttrium, and contaminants. For example, a sample grit blast material sieved through 240 mesh sieve was analyzed via XRF and found to have a metallic composition of 4.2% zirconium, 0.4% yttrium, 41% aluminum, 2.3% titanium, 1.0% silicon, 0.5% calcium, 0.2% nickel, 0.2% chromium, and other contaminants (this is a typical barrier spent grit blast material containing yttria stabilized zirconia barrier coat). This sample was used in the following experiments.

Acid Mixture Test (149R5)

A 0.2420 g portion of the above sample was treated at 60 degrees C. for 8 hours in an acid mixture comprised of 90% by weight 66% sulfuric acid and 10% ammonium bifluoride. After treatment, the sample was centrifuged and the supernatant was removed and analyzed via ICP-OES. It was found that 3.5% of the sample dissolved comprised of 2.0% zirconium, 0.7% yttrium, 0.2% aluminum, 0.3% calcium, 0.1% titanium from the sample was dissolved. This equates to the metal content in the supernatant as being 57% zirconium, 21% yttrium, 4% aluminum, 9% calcium, 2% titanium, and <7% other metals—this acid mixture is highly selective for yttria stabilized zirconium. As such, acid mixture 149R5 is effective for recovering yttria stabilized zirconium from spent aluminum grit. Secondary washing and nitric acid treatment did not recover any additional yttrium.

Acid Mixture Test (110R1)

A 0.3377 g portion of the above sample was treated at 60 degrees C. for 8 hours in an acid mixture comprised of 33% by weight 90% sulfuric acid, 33% ammonium bifluoride, and 33% water. After treatment, the sample was centrifuged and the supernatant was removed and analyzed via ICP-OES. It was found that 5.8% of the sample dissolved comprised of 2.8% zirconium, 0.0% yttrium, 0.7% aluminum, 0.3% iron, 0.4% silicon, and 1.1% titanium from the sample was dissolved. This equates to the metal content in the supernatant as being 49% zirconium, 0% yttrium, 11% aluminum, 4% iron, 8% silicon, 18% titanium, and <10% other metals—this acid mixture is highly selective for zirconium. As such, acid mixture 110R1 is effective for dissolving zirconium from spent aluminum grit. However, no yttrium was present in the solution, so additional treatment to recover yttrium was performed.

The resulting solid was washed with 10 mL deionized (DI) water and the washed solids were treated at 60 degrees C. for 8 hours in nitric acid. After treatment, the sample was centrifuged and the supernatant was removed and analyzed via ICP-OES. It was found that 1.1% of the sample dissolved comprised of 0.4% zirconium, 0.3% yttrium, 0.7% aluminum, 0.2% calcium, and 0.1% titanium from the sample was dissolved. This equates to the metal content in the supernatant as being 36% zirconium, 23% yttrium, 20% calcium, 7% titanium, and <14% other metals—this acid treatment was selective for zirconium and yttrium. As such, nitric acid post treatment is effective for recovering yttria stabilized zirconium from spent aluminum grit.

27% Ammonium Bifluoride

A 0.5300 g portion of the above sample was treated at 60 degrees C. for 8 hours in 27% ammonium bifluoride. After treatment, the sample was centrifuged and the supernatant was removed and analyzed via ICP-OES. It was found that 4.8% of the sample dissolved comprised of 3.1% zirconium, 0.2% iron, 0.1% manganese, 0.1% nickel, 0.4% silicon, and 0.8% titanium. No measurable yttrium dissolved. This equates to the metal content in the supernatant as being 64% zirconium, 0% yttrium, 1% aluminum, 4% iron, 9% silicon, 17% titanium, and <5% other metals—this acid mixture is highly selective for zirconium. As such, acid mixture 110R1 is effective for dissolving zirconium from spent aluminum grit. However, no yttrium was present in the solution. Additional treatment similar to that used with acid mixture 110R1, but using hydrochloric or sulfuric acid, may be used to recovery yttrium.

Sulfuric Acid Test

A 0.2010 g portion of the above sample was treated at 60 degrees C. for 8 hours in sulfuric acid. After treatment, the sample was centrifuged and the supernatant was removed and analyzed via ICP-OES. It was found that 0.5% of the sample dissolved comprised of 0.1% aluminum, 0.1% iron, 0.1% nickel, and 0.1% titanium. No measurable yttrium or zirconium dissolved. As such, sulfuric acid is less effective for recovering yttria stabilized zirconium from spent aluminum grit.

Nitric Acid Test

A 0.2007 g portion of the above sample was treated at 60 degrees C. for 8 hours in nitric acid. After treatment, the sample was centrifuged and the supernatant was removed and analyzed via ICP-OES. It was found that 0.9% of the sample dissolved comprised of 0.2% aluminum, 0.2% calcium, 0.1% iron, and 0.1% titanium. No measurable yttrium or zirconium dissolved. As such, nitric acid is less effective for recovering yttria stabilized zirconium from spent aluminum grit.

Aqua Regia Test

A 0.1998 g portion of the above sample was treated at 60 degrees C. for 8 hours in aqua regia acid. After treatment, the sample was centrifuged and the supernatant was removed and analyzed via ICP-OES. It was found that 2.3% of the sample dissolved comprised of 0.5% aluminum, 0.3% calcium, 0.1% cobalt, 0.1% chromium, 0.3% iron, 0.1% manganese, 0.3% nickel, 0.4% titanium, and 0.1% zirconium. No measurable yttrium and only trace zirconium dissolved. As such, aqua regia acid is less effective for recovering yttria stabilized zirconium from spent aluminum grit.

Hydrochloric Acid Test

A 0.2057 g portion of the above sample was treated at 60 degrees C. for 8 hours in hydrochloric acid. After treatment, the sample was centrifuged and the supernatant was removed and analyzed via ICP-OES. It was found that 1.8% of the sample dissolved comprised of 0.4% aluminum, 0.2% calcium, 0.1% cobalt, 0.1% chromium, 0.3% iron, 0.1% manganese, 0.2% nickel, 0.3% titanium, and 0.1% zirconium. No measurable yttrium and only trace zirconium dissolved. As such, hydrochloric acid is less effective for recovering yttria stabilized zirconium from spent aluminum grit.

Summary

As shown in FIG. 13, acid mixture 110R1 with secondary nitric acid treatment and acid mixture 149R5 was more effective at recovering yttria stabilized zirconium from spent aluminum grit both from a quantitative and qualitative perspective than sulfuric acid, nitric acid, aqua regia, and hydrochloric acid. 27% ammonium bifluoride readily dissolves zirconia. The yttrium content from the resulting solids may then be recovered using a process similar to that used for 110R1.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. All publications, patents, and patent applications mentioned herein are hereby incorporated by reference in their entirety as if each individual publication or patent was specifically and individually indicated to be incorporated by reference. In case of conflict, the present application, including any definitions herein, will control.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for recovering bond coat and/or barrier coat materials, comprising:
   applying one or more magnetic fields to a mixture comprising co-mingled bond coat and barrier coat materials under conditions effective to yield one or more paramagnetic fractions comprising a portion of the bond coat material and a diamagnetic fraction comprising a portion of the barrier coat material;
   subjecting the mixture to a first magnetic field under conditions effective to yield a first paramagnetic fraction comprising a paramagnetic bond coat oxide component and a paramagnetic-diamagnetic fraction comprising a paramagnetic bond coat component co-mingled with the diamagnetic barrier coat material; and
   subjecting the paramagnetic-diamagnetic fraction to a second magnetic field under conditions effective to separate the paramagnetic bond coat component from the diamagnetic barrier coat material;
   wherein said first magnetic field is weaker than said second magnetic field.

2. The method of claim 1, wherein the bond coat material and the barrier coat material each comprise one or more rare earth elements.

3. The method of claim 2, wherein the bond coat material comprises MCrAlY, wherein M is at least one of Fe, NI, and Co.

4. The method of claim 2, wherein the barrier coat material comprises yttria stabilized zirconia or other rare earth stabilizers in zirconia that are selected from the group consisting of calcia. ceria, scandia, magnesia, india, lanthana, neodymia, ytterbia, strontia, barium oxide, nickel oxide, ferric oxide, cobaltous oxide, dysprosia, gadolinia, samaria, erbia, europia, praseodymia, and mixtures thereof.

5. The method of claim 1, further comprising heating the mixture to a temperature effective to facilitate separation of the bond coat and barrier coat materials.

6. The method of claim 5, wherein the temperature is above 400° C.

7. The method of claim 1, wherein subjecting the mixture to the first magnetic field comprises exposing the mixture to a first magnet that attracts the paramagnetic bond coat oxide component, thereby separating the paramagnetic bond coat oxide component from the paramagnetic-diamagnetic fraction.

8. The method of claim 7, wherein the first magnet provides a field equivalent to a magnetic field generated by a magnetic separator operating at a current of between about 0.001 and about 0.15 amps.

9. The method of claim 1, wherein subjecting the paramagnetic-diamagnetic fraction to the second magnetic field comprises exposing the paramagnetic-diamagnetic fraction to a second magnet that repels the diamagnetic barrier coat material, thereby separating the bond coat component from the diamagnetic barrier coat material.

10. The method of claim 9, wherein the second magnet provides a field equivalent to a magnetic field generated by a magnetic separator operating at a current of greater than about 0.15 amps as measured at a ramp longitudinal incline of 5-25 degrees and an axial tilt of 0-25 degrees.

11. The method of claim 1, wherein subjecting the mixture to the first magnetic field is repeated one or more times prior to subjecting the paramagnetic-diamagnetic fraction to the second magnetic field.

12. The method of claim 1, wherein subjecting the paramagnetic-diamagnetic fraction to the second magnetic field is repeated one or more times.

13. The method of claim 1 further comprising:
   removing debris from the mixture through size exclusion prior to applying the one or more magnetic fields to the mixture.

14. The method of claim 13, wherein the debris is removed by passing the mixture through a sieving system in order to separate the debris from the co-mingled bond coat and barrier coat materials.

15. The method of claim 14, wherein the sieving, system has a mesh size of between about 100 and about 200.

16. The method of claim 13, wherein the debris comprises material other than the bond coat and barrier coat materials and has a particle size that is about 0.15 millimeters or greater.

17. The method of claim 1 further comprising:
   purifying, by way of chemically processing, one or more of the paramagnetic bond coat oxide component, the paramagnetic and coat component, or the diamagnetic barrier coat material isolated from the mixture.

18. The method of claim 1, further comprising collecting co-mingled excess bond coat material and barrier coat material from air plasma spray processes, electron beam physical vapor deposition processes, and/or barrier coat snipping processes.

19. The method of claim 18, wherein the barrier coat stripping process comprises stripping the barrier coat and at least a portion of the bond coat material from a substrate by chemical acid etching or by physical removal processing.

* * * * *